United States Patent
Mori et al.

(10) Patent No.: US 7,821,385 B2
(45) Date of Patent: Oct. 26, 2010

(54) DETECTION OF VEHICLE WHEEL POSITIONS USING TRIGGERING SIGNAL INCLUDING STARTUP COMMAND FOR STARTING THE DETECTION AND EXECUTION COMMAND FOR CALCULATING RECEPTION INTENSITY OF TRIGGERING SIGNAL

(75) Inventors: Masashi Mori, Oobu (JP); Nobuya Watabe, Nagoya (JP)

(73) Assignee: Denso Corporation, Kariya (JP)

( * ) Notice: Subject to any disclaimer, the term of this patent is extended or adjusted under 35 U.S.C. 154(b) by 447 days.

(21) Appl. No.: 11/964,259

(22) Filed: Dec. 26, 2007

(65) Prior Publication Data

US 2008/0157950 A1    Jul. 3, 2008

(30) Foreign Application Priority Data

Dec. 29, 2006    (JP) ............................. 2006-356829

(51) Int. Cl.
*B60C 23/00* (2006.01)
(52) U.S. Cl. ..................... 340/447; 340/442; 73/146.5
(58) Field of Classification Search ................. 340/442, 340/445, 447, 539.1; 73/146, 146.2, 146.4, 73/146.5

See application file for complete search history.

(56) References Cited

U.S. PATENT DOCUMENTS

| 5,602,524 | A | 2/1997 | Mock et al. |
| 6,879,252 | B2 | 4/2005 | DeZorzi et al. |
| 6,888,446 | B2 | 5/2005 | Nantz et al. |
| 2004/0095233 | A1 | 5/2004 | DeZorzi et al. |
| 2005/0253696 | A1 | 11/2005 | Mori et al. |
| 2006/0006992 | A1 | 1/2006 | Daiss et al. |
| 2007/0008097 | A1 | 1/2007 | Mori et al. |

FOREIGN PATENT DOCUMENTS

| JP | H07-507513 | 8/1995 |
| JP | 2004-196007 | 7/2004 |
| JP | 2005-350046 | 12/2005 |
| JP | 2007-015491 | 1/2007 |

OTHER PUBLICATIONS

U.S. Appl. No. 11/957,025, filed Dec. 2007, Mori et al.
U.S. Appl. No. 11/963,238, filed Dec. 2007, Mori et al.
Korean Office Action dated Nov. 30, 2009, issued in corresponding Korean Application No. 10-2007-139856, with English translation.
Korean Office Action dated Nov. 30, 2009, issued in corresponding Korean Application No. 10-2007-139856, with English translation.

*Primary Examiner*—Jeffery Hofsass
(74) *Attorney, Agent, or Firm*—Nixon & Vanderhye PC

(57) ABSTRACT

In a vehicle's wheel position detecting apparatus, plural transceivers respectively attached to the front and rear four wheels are provided. Each transceiver receives a triggering signal, calculates a reception intensity of the triggering signal, stores data indicating the reception intensity into a frame, and transmits the frame to a receiver attached to a vehicle's body. Each triggering signal radio-transmitted from the first and second triggering devices contains a startup command to starts up each transceiver and an execution command to allow each transceiver to calculate the reception intensity. The first and second triggering devices, which are responsible for radio-transmitting the triggering signal toward at least the front wheels and the rear wheels respectively, are positionally offset to either way in the body's lateral direction. A receiver receives the frames and uses the frames radio-transmitted from the transceivers to detect the wheels' positions using the reception intensity in each frame.

23 Claims, 10 Drawing Sheets

DETECTION OF VEHICLE WHEEL POSITIONS USING TRIGGERING SIGNAL INCLUDING STARTUP COMMAND FOR STARTING THE DETECTION AND EXECUTION COMMAND FOR CALCULATING RECEPTION INTENSITY OF TRIGGERING SIGNAL

CROSS-REFERENCE TO RELATED APPLICATION

This application is based on and claims the benefit of priority from earlier Japanese Patent Application No. 2006-356829 filed Dec. 29, 2006, the description of which is incorporated herein by reference.

BACKGROUND OF THE INVENTION

1. Field of the Invention

The present invention relates to an apparatus for detecting the wheel positions of a vehicle, on which respective wheels are installed, an apparatus for detecting the inflation pressure of the tires of a vehicle, such as a direct-type tire inflation pressure detection apparatus, and transceivers therefor.

2. Description of the Related Art

A direct-type apparatus for detecting the inflation pressure of tires of a vehicle is known. This tire inflation pressure detecting apparatus is provided with a transceiver equipped with a sensor such as a pressure sensor, which is directly installed on each wheel with a tire. An antenna and a receiver are provided in the vehicle body. Thus, when the receiver receives, via the antenna, from the transmitter a detection signal detected by the sensor, the receiver is able to detect the inflation pressure of each tire based on the received detection signal.

In this direct-type tire inflation pressure detecting apparatus, it is determined whether or not data which has been received is coming from the transceiver of the own vehicle and it is determined on which of the wheels a transceiver in question is installed. For these determinations, as shown in U.S. Pat. No. 5,602,524 (which corresponds to Japanese Patent No. 3212311), data to be transmitted from each transceiver additionally contains ID (identification) information to distinguish the own vehicle from other vehicles and identify each wheel with the transceiver. The ID information is previously stored in the receiver and, when the receiver receives data from the transceiver, the stored ID information and the received ID information are used to determine the wheel the data is coming from.

Without the ID information assigned to each of the wheels, a received data cannot be determined as to which of the transceivers corresponding to the respective wheels the data is originated from. In other words, without using the ID information, the positions of the individual transceivers in the vehicle cannot be detected. Therefore, for example, when a user changes the positions of the tires by rotation, for example, the user has to read the ID information of the rotated tires and renew the ID information that has been registered up to then. Without doing this, the tire inflation pressure detecting apparatus cannot cope with the position change of the wheels.

Therefore, it is desired that a tire inflation pressure detecting apparatus can detect the wheels equipped with the respective transceivers without using the ID information (wheel-position information). In other words, it is desired that a tire inflation pressure detecting apparatus can detect the positions on which the respective transceivers are installed. Alternatively, where it is necessary to renew the ID information because of the position change of the wheels, the renewal of the ID data is desired to be automatically performed.

On the other hand, U.S. Publication No. 2004/95233 suggests an apparatus for specifying wheel positions. This apparatus includes an antenna for front wheels, which is located so that the distances therefrom to the left- and right-front wheels will be different, and an antenna for rear wheels, which is located so that the distances therefrom to the left- and right-rear wheels will be different. LF (low-frequency) waves are outputted from these antennas for transmission to transceivers (sensors) set at the individual wheels. The wheel positions are specified based on the reception rate of the LF waves at the individual transceivers. More specifically, the distances from the front-wheel antenna to the transceivers for the left- and right-front wheels are different, and the distances from the rear-wheel antenna to the transceivers for the left- and right-rear wheels are different. Further, the larger the distance is from the generation source of the LF waves to the destination, the weaker the intensity of the LF waves become. Accordingly, the reception rates of the LF waves are different between the transceivers installed on the left- and right-front wheels. Similarly, the reception rates of the LF waves are also different between the transceivers installed on the left- and right-rear wheels. Making use of this property, correlation of the transceivers to the left- and right-front wheels and to the left- and right-rear wheels is detected.

Further, U.S. Pat. No. 6,888,446 suggests an apparatus for detecting correlation of the individual transceivers to the respective wheels. In this apparatus, the detection is conducted making use of the fact that distances from various noise generation sources in the vehicle to the individual transceivers installed on the respective wheels are different, and also making use of the property that the larger the distance is from a noise generation source to a transceiver, the weaker the intensity of the noise becomes.

However, the apparatus disclosed in U.S. Publication No. 2004/95233 is required to establish a relationship that the LF waves outputted from the front-wheel antenna are reliably transmitted to one of the left- and right-front wheels and not to the other. The same applies to the LF waves outputted from the rear-wheel antenna. The establishment of these relationships depends on the intensities of the LF waves and the reception sensitivities of the individual transceivers. These relationships are very difficult to be established. Even if there is a design that can establish such relationships, the design may have poor flexibility. In addition, even if such relationships can be established, it will take time for calculating the reception rates of the LF waves at the transceivers for the left- and right-front wheels and the reception rates of the LF waves at the transceivers for the left- and right-rear wheels. Accordingly, the time taken for the wheel position detection will be long. This may also involve a difficulty, for example, of reliably detecting the wheel positions before traveling. In the case where tire inflation pressure is detected on the basis of the results of the wheel position detection, it is particularly important to provide a configuration which can reliably detect the tire inflation pressure before traveling.

The apparatus disclosed in U.S. Pat. No. 6,888,446 has poor compatibility with vehicles because the noise generation sources are different depending on the types of the vehicles. In other words, this apparatus has a difficulty in achieving good compatibility with vehicles regardless of the types of the vehicles. In particular, in the case where wheel position detection is carried out merely based on noises, the apparatus cannot cope with such noises that are produced by devices loaded on the vehicle according to the user's taste. Further, the timing of each of the noises that are considered to be produced during the on-state of the ignition switch cannot be estimated. Therefore, it is not easy to simultaneously transmit triggering signals to all of the transceivers for the purpose of wheel position detection. For this reason, it will take a long time to conduct the wheel position detection, or it will be difficult, for example, to reliably conduct wheel position detection before traveling.

SUMMARY OF THE INVENTION

The present invention has been made in light of the circumstances described above and has as its object to provide a wheel position detecting apparatus which is able to detect the correlation of the transceivers with the wheels on which the transceivers are installed, without the need of performing readout, for example, of the ID information by the user. In particular, the present invention has an object of providing a wheel position detecting apparatus having compatibility to vehicles regardless of the types of the vehicle and is capable of conducting high-speed wheel position detection with reliability.

In order to achieve the object provided above, in a first mode of the present invention, first and second triggering devices are adapted to output triggering signals each containing startup commands for starting up a transceiver and execution commands for allowing the transceiver to measure (i.e., calculate) the reception intensity of the triggering signal (i.e., the amplitude of the received triggering signal). Upon reception of the triggering signal outputted from the first triggering device, each of transceivers installed on left- and right-front wheels is adapted to start up triggered by the startup commands and then measure the reception intensity triggered by the execution commands. The transceiver then stores a reception intensity data in a frame, followed by transmission. Similarly, upon reception of the triggering signal outputted from the second triggering device, each of transceivers installed on left- and right-rear wheels is adapted to start up triggered by the startup commands and then measure the reception intensity triggered by the execution commands. The transceiver then stores a reception intensity data in a frame, followed by transmission. Then, a second control unit provided at a receiver receives the frames, and correlates the associated transceivers with the left- and right-front wheels on which the transceivers are installed, based on the reception intensities stored in the frames transmitted from the transceivers installed on the left- and right-front wheels. Similarly, the second control unit correlates the associated transceivers with the left- and right-rear wheels on which the transceivers are installed, based on the reception intensities stored in the frames transmitted from the transceivers installed on the left- and right-rear wheels.

Thus, the triggering signals outputted from the first triggering device are adapted to reach the two transceivers installed on the left- and right-front wheels, while the triggering signals outputted from the second triggering device are adapted to reach the two transceivers installed on the left- and right-rear wheels. The individual transceivers are then started up by the startup commands and allowed to measure the reception intensities of the triggering signals by the execution commands contained in the triggering signals. Further, the transceivers installed on the respective wheels are ensured to be identified by utilizing the property that the intensity of a triggering signal becomes lower as the distance from the first and second triggering devices to each of the transceivers becomes larger. Thus, the individual transceivers can be reliably started up by the output of the triggering signals from the first and second triggering devices. At the same time, immediately after the startup, processes for wheel position detection can be reliably executed. Accordingly, prompt and reliable wheel position detection can be achieved without the necessity of having the triggering signals outputted repeatedly. In particular, performing wheel position detection by starting up the individual transceivers immediately after turning the ignition switch from an off-state to an on-state, will enable wheel position detection before traveling, or enable reliable tire inflation pressure detection before traveling. In addition, high flexibility may be achieved in the design because the triggering signals outputted from the first and second triggering devices may only have to be reliably transmitted to the transceivers installed on the left and right wheels. Also, comparing with the case of using noises, high compatibility to vehicles can be achieved.

In this mode of the invention, the first and second triggering devices are desirably disposed being offset in the same direction from a center line which symmetrically divides the vehicle body left and right. In the case where triggering signals are outputted from the first triggering device, use of such an offset arrangement may enable the receiver to identify the wheel, for example, in the left- and right-front wheels, which are located closer to the first triggering device, based on the reception intensity data stored in the frames transmitted from the associated transceivers. Similarly, in the case where triggering signals are outputted from the second triggering device, use of such an offset arrangement may enable the receiver to identify the wheel, for example, in the left- and right-rear wheels, which are located closer to the second triggering device, based on the reception intensity data stored in the frames transmitted from the associated transceivers. Further, the wheel which is located further from the first triggering device in the left- and right-front wheels can be identified, based on the reception intensity data stored in the frames transmitted from the associated transceivers in the case where the triggering signals are outputted from the first triggering device. Similarly, the wheel which is located further from the second triggering device in the left- and right-rear wheels can be identified, based on the reception intensity data stored in the frames transmitted from the associated transceivers in the case where the triggering signals are outputted from the second triggering device. In this way, the four transceivers installed on the respective wheels can be identified.

In a second mode of the present invention, first and second triggering devices are adapted to output triggering signals each containing startup commands for starting up a transceiver and execution commands for allowing the transceiver to measure the reception intensity of the triggering signal. Upon reception of the triggering signals outputted from the first triggering device, each of the transceivers installed on the two right wheels is adapted to start up triggered by the startup commands, then measure the reception intensity of the triggering signal triggered by the execution commands, and store the reception intensity data in a frame, for transmission to the receiver. Similarly, upon reception of the triggering signals outputted from the second triggering device, each of the transceivers installed on the two left wheels is adapted to start up triggered by the startup commands, then measure the reception intensity of the triggering signal triggered by the execution commands, and store the reception intensity data in a frame, for transmission to the receiver. The frames are received by the second control unit of the receiver. The second control unit identifies which of the two right wheels each of the associated transceivers is installed on, based on the reception intensity data stored in the frames transmitted from these transceivers. Similarly, the second control unit identifies which of the two left wheels each of the associated transceivers is installed on, based on the reception intensity data stored in the frames transmitted from these transceivers.

In the first mode of the present invention, wheel position detection has been conducted by allowing the first triggering device to output triggering signals to the left- and right-front wheels, and allowing the second triggering device to output triggering signals to the left- and right-rear wheels. However, as exemplified in the second mode of the invention, wheel position detection can also be conducted by allowing is the first triggering device to output triggering signals to the two right wheels, and allowing the second triggering device to output triggering signals to the two left wheels. In this mode as well, advantages similar to those of the first mode of the invention can be obtained.

In the second mode of the invention, the first and second triggering devices are desirably disposed being offset in the same direction from the center line which symmetrically divides the vehicle body front and rear. In the case where triggering signals are outputted from the first triggering device, use of such an offset arrangement may enable the receiver to identify the wheel, for example, in the two right wheels, which is located closer to the first triggering device, based on the reception intensity data stored in the frames transmitted from the associated transceivers. Similarly, in the case where triggering signals are outputted from the second triggering device, use of such an offset arrangement may enable the receiver to identify the wheel, for example, in the two left wheels, which is located closer to the second triggering device, based on the reception intensity data stored in the frames transmitted from the associated transceivers. Further, the wheel which is located further from the first triggering device in the two right wheels can be identified, based on the reception intensity data stored in the frames transmitted from the associated transceivers in the case where the triggering signals are outputted from the first triggering device. Similarly, the wheel which is located further from the second triggering device in the two left wheels can be identified, based on the reception intensity data stored in the frames transmitted from the associated transceivers in the case where the triggering signals are outputted from the second triggering device. In this way, the four transceivers installed on the respective wheels can be identified.

Although the present invention in the above description is exemplified as a wheel position detecting apparatus, the wheel position detecting apparatus can be incorporated in a tire inflation pressure detecting apparatus. Also, although the present invention in the above description is taken as an invention of a system configuration serving as a wheel position detecting apparatus, it can also be taken as an invention of a transceiver or a receiver.

DETAILED DESCRIPTION OF THE PREFERRED EMBODIMENTS

Figure 1:
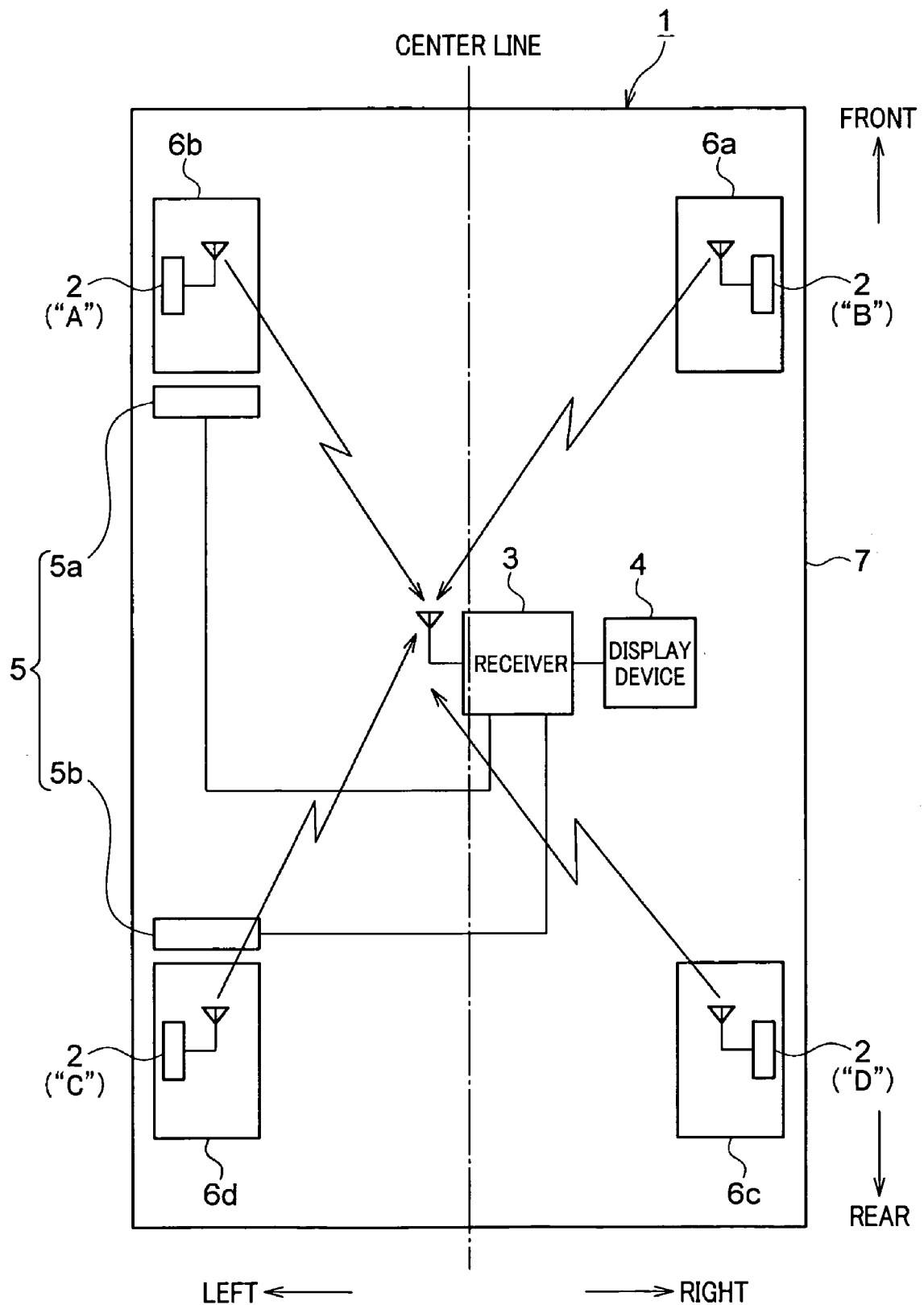
FIG. 1 is a block diagram generally illustrating a tire inflation pressure detecting apparatus to which a wheel position detecting apparatus according to a first embodiment of the present invention is applied.

With reference to the accompanying drawings, hereinafter will be described some embodiments of the present invention. Throughout the embodiments, the identical or similar components, if any, are given the same reference numerals or symbols for the sake of omitting explanation.

First Embodiment

A first embodiment of the present invention will now be described referring to the drawings. FIG. 1 is a block diagram generally illustrating a tire inflation pressure detecting apparatus, in which a wheel position detecting apparatus is applied, according to a first embodiment of the present invention. A direction toward an upper portion of the drawing sheet of FIG. 1 corresponds to a frontward direction of a vehicle 1, and a direction toward a lower portion of the drawing sheet of FIG. 1 corresponds to a rearward direction of the vehicle 1. Referring to FIG. 1, a tire inflation pressure detecting apparatus according to the present invention is described.

As shown in FIG. 1, the tire inflation pressure detecting apparatus, which is or is to be mounted on a vehicle 1, includes four transceivers 2 (i.e., each serves as a transmitter/receiver), a receiver 3, a display device 4, and triggering devices 5. In the present embodiment, the transceivers 2, the receiver 3, and the triggering devices 5 compose the wheel position detecting apparatus according to the present invention.

Each of the transceivers 2 is mounted on one of the four wheels 6a-6d, so as to have association with the tire on one of the wheels 6a-6d. Each transceiver 2 works to sense the inflation pressure of the associated tire and transmit a frame of data that contains tire pressure information indicative of the sensed inflation pressure of the associated tire.

On the other hands the receiver 3 is mounted on a body 7 of the vehicle 1. In the present invention, the body 7 means an assembly of all the remaining parts other than the wheels. The receiver 3 works to receive all the frames of data transmitted by the transceivers 2 and determine the inflation pressure of each of the four tires based on the tire pressure information contained in the received frames of data.

Figure 2:
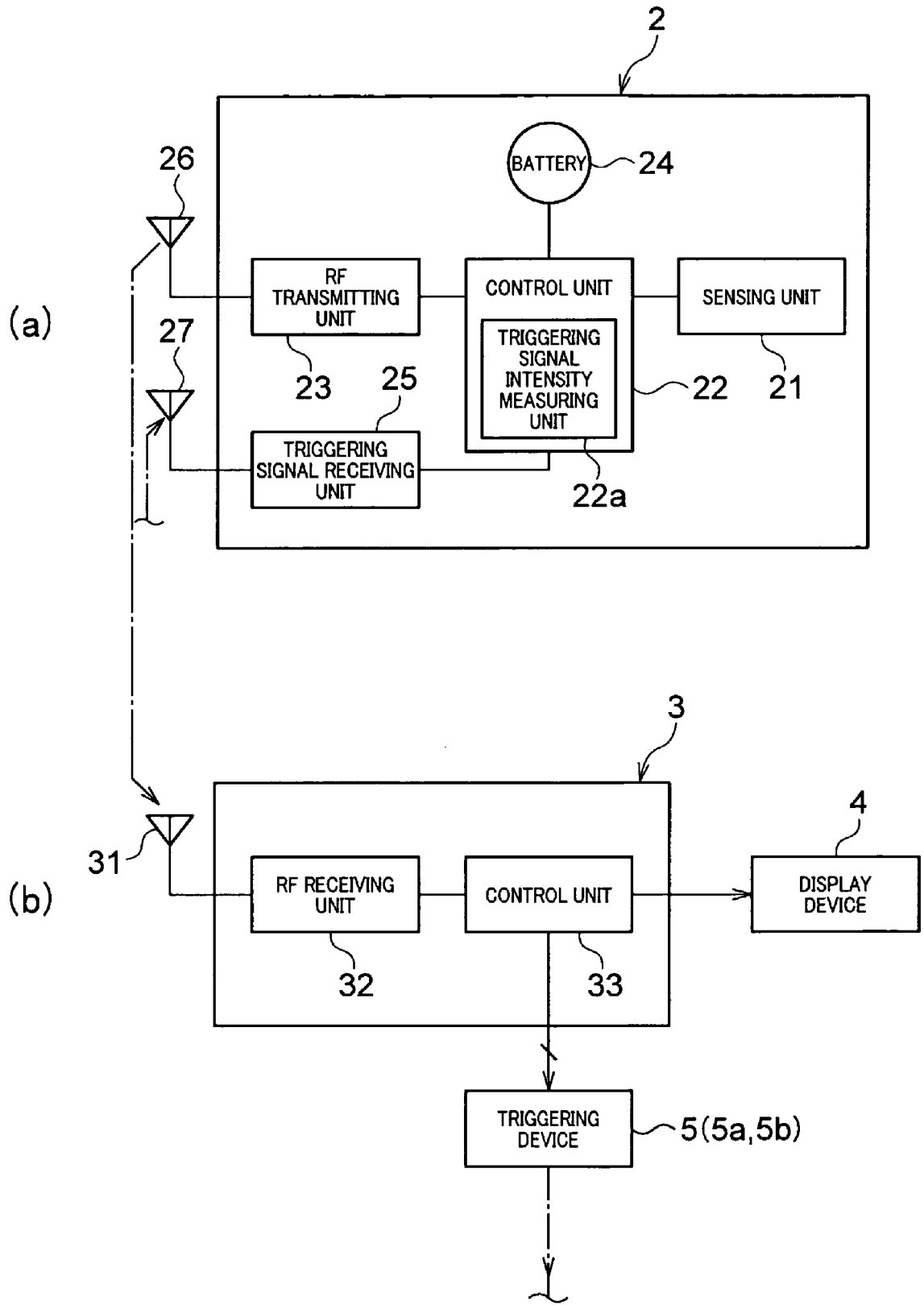
FIG. 2 is a block diagram illustrating each transceiver and a receiver of the tire inflation pressure detecting apparatus illustrated in FIG. 1.

FIG. 2 shows in block forms the configurations of each of the transceivers 2 and the receiver 3, respectively. As shown in FIG. 2(a), each transceiver 2 is configured with a sensing unit 21, a control unit 22, an RF (radio-frequency) transmitting unit 23, a battery 24, a triggering signal receiving unit 25, a transmitting antenna 26 and a receiving antenna 27. Of these, the control unit 22 serves as a first processing unit that performs various predetermined processes.

The sensing unit 21 is configured with sensors, such as a diaphragm-type pressure sensor and a temperature sensor, and works to output signals representative of the sensed inflation pressure of the tire and the sensed temperature of air in the tire.

The control unit (first control unit) 22 is made up of a known microcomputer having, for example, a CPU (Central Processing Unit), ROM (Read-Only Memory), RAM (Random Access Memory) and I/O (Input/Output) interfaces, and executes predetermined processes according to programs stored in the ROM, for example.

Specifically, the control unit 22 receives a detection signal associated with inflation pressure of the tire from the sensing unit 21. The received signal is then conditioned and, if necessary, processed by the control unit 22 and stored in a transmission frame in the form of data indicative of the results of detection (hereinafter referred to just as "inflation pressure data"), together with ID information of the transceiver 2. The frame is then transmitted to the RF transmitting unit 23. The processes for transmitting a signal to the RF transmitting unit 23 is periodically executed according to the programs mentioned above.

The control unit 22 is normally in a sleep mode when an ignition switch is in an off-state. The control unit 22 is switched to a wake-up mode upon reception of a triggering signal which is outputted when the ignition switch is turned to an on-state, followed by the inputting of a startup command contained in the triggering signal. The control unit 22 is again switched to a sleep mode upon reception of a triggering signal which is outputted when the ignition switch is turned to an off-state, followed by the inputting of a halt command contained in the triggering signal.

The control unit 22 is provided with a triggering signal intensity measuring unit 22a. When a triggering signal is received from the triggering device 5 through the receiving antenna 27 and the triggering signal receiving unit 25, the control unit 22 is switched to a wake-up mode to have the triggering signal intensity (amplitude) measured (calculated) by the triggering signal intensity measuring unit 22a. The control unit 22 then processes the reception intensity data as required, stores the reception intensity data in the frame that has stored the inflation pressure data, or in a different frame, and transmits the frame to the RF transmitting unit 23. These processes of measuring the reception intensity of the triggering signal and transmitting the reception intensity data to the RF transmitting unit 23 are also performed according to the programs mentioned above.

The control unit 22 also controls timing for transmitting the frame to the RF transmitting unit 23. This control is purposed to prevent butting between transmission data coming from the individual transceivers 2. For example, transmission timing, that is, how many seconds later the frame should be transmitted after receiving the triggering signal, is differently preset for every transceiver 2. Accordingly, each frame is ensured to be transmitted at different timing from each of the transceivers 2 of the wheels 6a-6d.

However, the memory contents will become different between the individual transceivers 2, or different programs have to be prepared between the individual transceivers 2, if merely the different transmission timing is stored in the control unit 2 of each of the transceivers 2 installed on the wheels 6a-6d for the purpose of ensuring transmission of the frames at different timing between the transceivers 2. In this regard, all the programs of the control units 22 can be shared between the transceivers 2 by offsetting the transmission timing between the frames according to the reception intensity. To this end, for example, a map may be prepared so that the transmission timing can be selected according to the reception intensity. Alternatively, a function formula may be stored in the control unit 22 to calculate the transmission timing using transmission intensity as a variable, so that the transmission timing is inevitably differentiated between the transceivers 2 by the different reception intensity.

Alternatively, the programs stored in the control unit 22 may be prepared in such a way that the transmission timing can be randomly changed at every occurrence. The random change of the transmission timing can ensure, with high probability, complete differentiation of the transmission timing between the transceivers 2.

The RF transmitting unit 23 transmits the frame transmitted from the control unit 22 to the receiver 3 through the transmitting antenna 26. The RF transmitting unit 23 functions as an output unit for transmitting the frame to the receiver 3 in RE band, or at 315 MHz, for example.

In this sense, the triggering signal receiving unit 25 functions as an input unit for receiving the triggering signal through the receiving antenna 27 and transmitting it to the control unit 22.

The battery 24 supplies power to the control unit 22, and the like. The power supply of the battery 24 enables, for example, collection of the inflation pressure data in the sensing unit 21 or calculations in the control unit 22.

The transceiver 2 configured in this way is attached, for example, to an air-charge valve of each of the wheels 6a-6d and arranged with the sensing unit 21 being exposed to the inside of the tire. Thus, it is so configured that an associated tire inflation pressure is detected to transmit the frame at the every predetermined interval (e.g., every minute) through the transmitting antenna 26 provided at each of the transceivers 2.

As shown in FIG. 2(b), the receiver 3 includes an antenna 31, an RF receiving unit 32 and a control unit 33 which serves as a second processing unit that performs various predetermined processes.

The antenna 31, which is fixed to the vehicle body 7, is a single antenna shared between the individual transceivers 2. The antenna 31 receives all the frames transmitted from the individual transceivers 2.

Upon reception of the frames from the individual transceivers 2 by the antenna 31, the RF receiving unit 32 inputs these frames and transmits them to the control unit 33. The RF receiving unit 32 functions as an input unit.

The control unit 33 is made up of a known microcomputer having, for example, a CPU, ROM, RAM and I/O and executes predetermined processes according to programs stored in the ROM.

Specifically, the control unit 33 outputs a triggering command signal for commanding output of a triggering signal to the triggering device 5. At the same time, the RF receiving unit 32 receives the frames and performs wheel position detection. The detection is performed by specifying the correlation of each of the transmitted frames with the associated one of the transceivers 2 installed on the four wheels 6a-6d, on the basis of the reception intensity data of the triggering signal at the transceiver 2, which is stored in each of the frames.

Further, the control unit 33 performs signal processes and calculations based on the data indicative of the results of detection, which data is stored in each of the received frames. Through these processes and calculations, a tire inflation pressure is obtained. Then, an electrical signal corresponding to the obtained tire inflation pressure is outputted to the display device 4. For example, the control unit 33 compares the obtained tire inflation pressure with a predetermined threshold "Th". When it is detected, through the comparison, that the tire inflation pressure has been reduced, the control unit 33 outputs a signal accordingly to the display device 4. Thus, reduction of the tire inflation pressure of any of the four wheels 6a-6d can be transmitted to the display device 4.

As shown in FIG. 1, the display device 4 is disposed at a position for enabling the driver to visually recognize it. The display device 4 is made up, for example, of a warning lamp which is arranged in an instrumental panel in the vehicle 1. When, for example, a signal indicating reduction of a tire inflation pressure is transmitted from the control unit 33 of the receiver 3, the display device 4 indicates accordingly so as to warn the driver of the reduction of the tire inflation pressure.

Upon input of the triggering command signal transmitted from the control unit 33 of the receiver 3, the triggering device 5 outputs a triggering signal of predetermined signal intensity in LF (low-frequency) band ranging, for example, from 125 to 135 kHz. In the present embodiment, the triggering device consists of two triggering devices, i.e. a first triggering device 5a disposed on the side of the front wheels, and a second triggering device 5b disposed on the side of the rear wheels. For example, as triggering signals containing startup commands, modes of signal as shown in FIGS. 3A to 3C are usable.

Figure 3A:
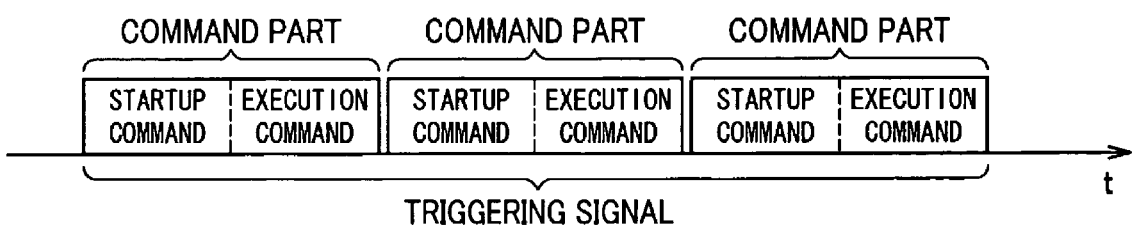
FIGS. 3A to 3C are pattern diagrams illustrating modes of triggering signals.

FIG. 3A shows a mode of a triggering signal, in which a plurality of frames, each storing a command part, are arranged. Each command part contains a startup command and an execution command. The startup command is fixed, in advance, as a command for switching the control unit 22 of each transceiver 22 from a sleep mode to a wake-up mode. The execution command gives operation instructions for measuring the reception intensity of a received triggering signal, processing the reception intensity data as required, storing the reception intensity data in the frame that has stored the inflation pressure data, or in a different frame, and then transmitting the frame to the RF transmitting unit 23. For example, such a triggering signal may be an electromagnetic wave of 125 kHz. Upon reception of a frame storing a first command part, the transceiver 2 measures the reception intensity of the subsequent frame storing a second command part, to thereby achieve measurement of the reception intensity of the triggering signal. Exemplification here shows a triggering signal in which three frames, each storing a command part, are juxtaposed with each other. The number of the frames however may be two, or four or more. The interval between the frames may be intermittent as shown in FIG. 3A, or may be continuous.

Figure 3B:
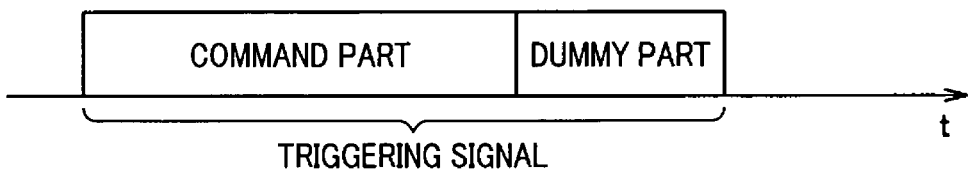

FIG. 3B shows modes of a triggering signal consisting of a frame which stores a command part and a dummy part. Similar to the above mode, the command part includes a startup command and an execution command. The dummy part is used for reception intensity measurement, and thus may be served just by a modulated or nonmodulated carrier signal. For example, such a triggering signal may be an electromagnetic waveform of 125 kHz. Upon reception of the command part, the transceiver 2 measures the reception intensity of the subsequent dummy part to thereby achieve measurement of the reception intensity of the triggering signal.

Figure 3C:
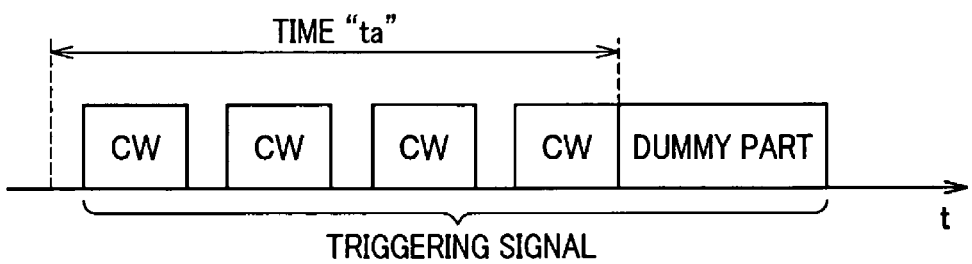

FIG. 3C shows a mode of a triggering signal consisting of a frame which stores a pulse train of signals and a dummy part. The pulse train includes a predetermined number (e.g. four) of pulse signals CW in a fixed period "ta". The pulse train serves as a startup command for switching the transceiver 2 to a wake-up mode. The pulse signals CW may be AM-modulated signals or nonmodulated signals. Similar to the above mode, the dummy part is used for reception intensity measurement. For example, such a triggering signal may be an electromagnetic wave of 125 kHz. Upon reception of the predetermined number (four) of pulse signals CW within the fixed period "ta", the transceiver 2 measures the reception intensity of the subsequent dummy part to thereby achieve measurement of the reception intensity of the triggering signal.

A mode of a triggering signal containing a halt command is not shown, but such a mode may include a triggering signal only storing frames of command parts that contain halt commands, or a triggering signal storing a pulse train which contains pulsed signals within a fixed period, the number of the pulsed signals being different from the case of the startup command. The triggering signal storing a halt command is not used for identifying the wheels. Accordingly, such a triggering signal may have a signal intensity different from that of the triggering signal storing a startup command.

Since the modes of the triggering signals here are shown by way of examples only, triggering signals may have other modes. For example, a frame constituting a triggering signal may be separated into a frame for switching the transceiver 2 to a wake-up mode, and a frame for measuring the reception intensity. In this case, the frame for switching the transceiver 2 to a wake-up mode, which is not needed to be used for measuring the reception intensity, may have different reception intensity from the frame used for measuring reception intensity. The two separate frames, which integrally constitute a triggering signal, can be regarded as a single triggering signal even when the triggering signal is temporally segmented.

The triggering devices 5a and 5b are disposed being offset from the center line which bilaterally symmetrically divides the vehicle 1, so that the triggering devices 5a and 5b have different distances to the respective corresponding wheels. In the present embodiment, the first triggering device 5a is disposed in the vicinity of the left-front wheel 6b, and the second triggering device 5b is disposed in the vicinity of the left-rear wheel 6d. Both of the triggering devices 5a and 5b are disposed on the left side of the center line. Accordingly, the distance from the first triggering device 5a to the right-front wheel 6a is larger than the distance from the first triggering device 5a to the left-front wheel 6b. Also, the distance from the second triggering device 5b to the right-rear wheel 6c is larger than the distance from the second triggering device 5b to the left-rear wheel 6d.

The positions for locating the first and second triggering devices 5a and 5b are determined in such a way that the distances from the transceivers 2 installed on the two front wheels 6a and 6b to the first triggering device 5a will be always smaller than the distances therefrom to the second triggering device 5b even when the two front wheels 6a and 6b are rotated, and that the distances from the transceivers 2 installed on the two rear wheels 6c and 6d to the second triggering device 5b will be smaller than the distances therefrom to the first triggering device 5a even when the two front wheels 6c and 6d are rotated.

The triggering devices 5a and 5b may be located at any places whose perimeters are not entirely covered with metal. However, it is preferred that each of the triggering devices 5a and 5b is located, as much as possible, at a place which is not covered with metal, or in a place which will not be hit by stones or the like during traveling, such as in a liner interior or vehicle interior. Also, it is preferred that each of the triggering devices 5a and 5b is located at a position that makes the difference in the distances large therefrom to the individual wheels 6a-6d. For example, the triggering devices 5a and 5b may be disposed rearward of the rear wheels 6c and 6d and frontward of the front wheels 6a and 6b, respectively.

The description has so far been given on a configuration of the tire inflation pressure detecting apparatus in which the wheel position detecting apparatus of the present embodiment is applied.

Figure 4:
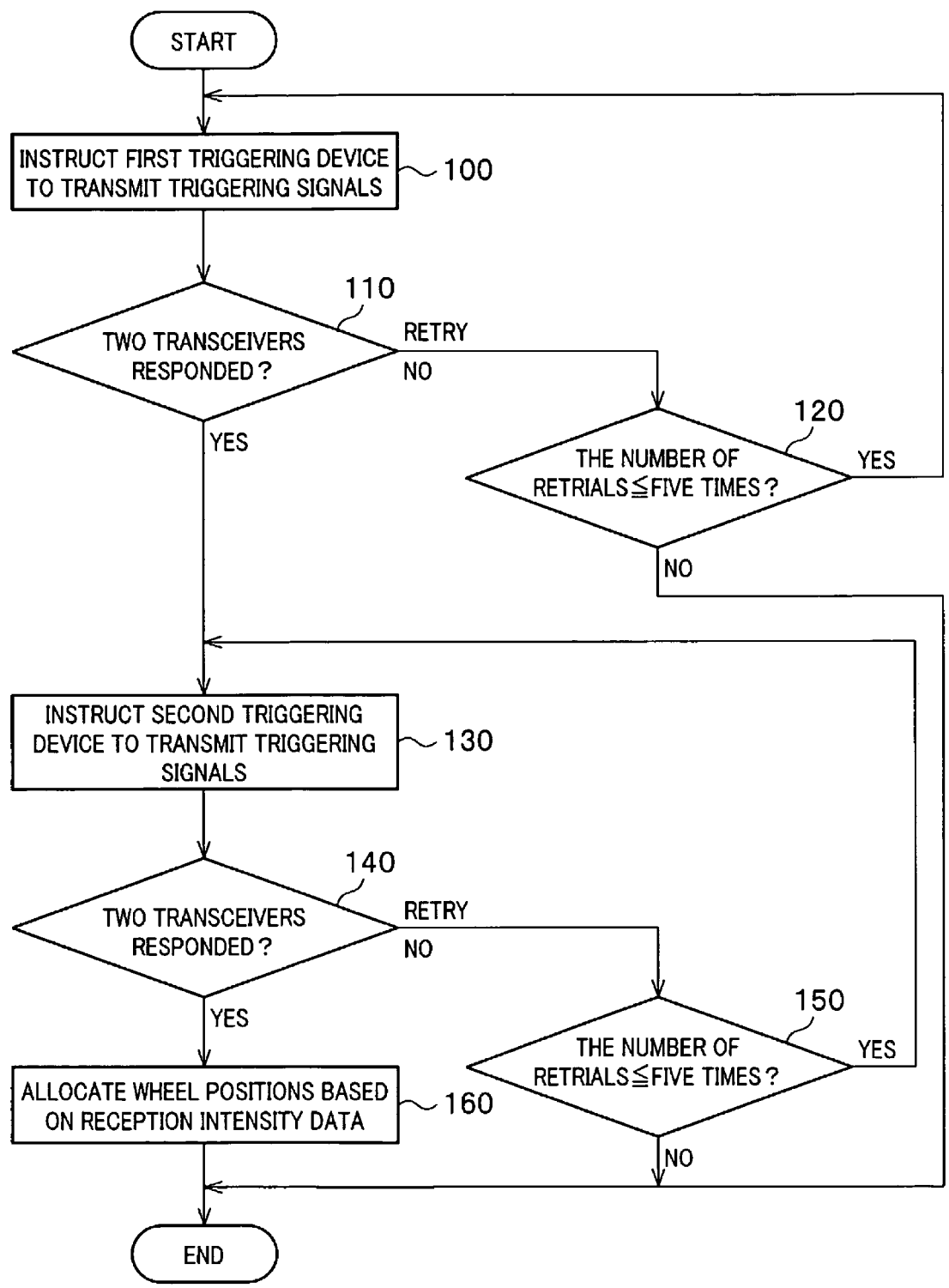
FIG. 4 is a flow diagram illustrating processes of wheel position detection executed by a control unit of each transceiver.
Figure 5:
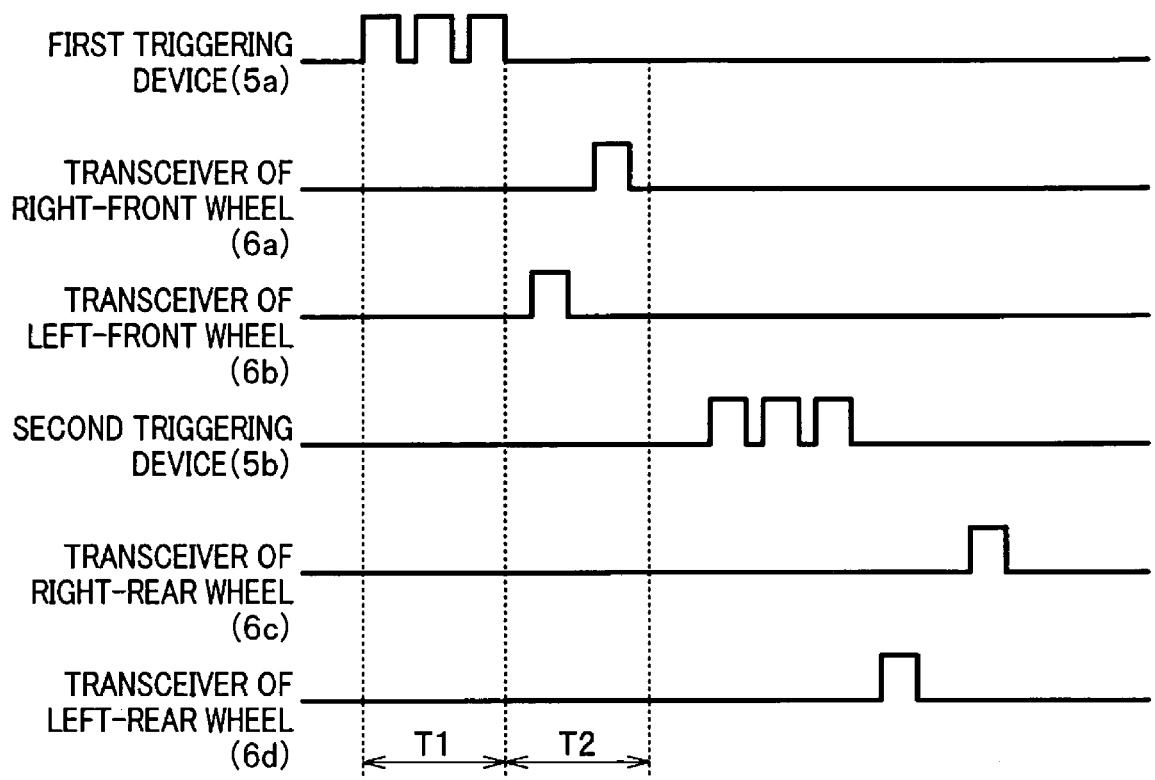
FIG. 5 is a timing diagram illustrating an example of the timing of transmission of triggering signals from first and second triggering devices and transmission of frames from individual transceivers.

Hereinafter will be described an operation of the tire inflation pressure detecting apparatus according to the present embodiment. The tire inflation pressure detecting apparatus carries out wheel position detection after the switching of an ignition switch, not shown, from an off-state to an on-state, and after the lapse of a predetermined period from when power of the control unit 33 of the receiver 3 has been turned on. For example, the wheel position detection is carried out immediately after completion of a predetermined initial check. The wheel position detection is carried out by having the control unit 33 of the receiver 3 executed the processes of wheel position detection. FIG. 4 is a flow diagram illustrating the processes of wheel position detection executed by the control unit 33 of the receiver 3. FIG. 5 is a timing diagram illustrating an example of the timing of transmission of triggering signals from the first and second triggering devices 5a and 5b and transmission of the frames from the individual transceivers 2.

At step 100 of FIG. 4, a triggering command signal is outputted to the first triggering device 5a after the lapse of a predetermined period from when the power has been turned on. When the triggering command signal is inputted to the first triggering device 5a, triggering signals each having a predetermined intensity and containing startup commands are outputted from the first triggering device 5a to the transceivers 2 installed on the left- and right-front wheels 6a and 6b. For example, in the case where the triggering signal has the mode shown in FIG. 3A, triggering signals each containing three frames are outputted as indicated at a period T1 in FIG. 5.

Each of the triggering signals is inputted to the control unit 22 of each of the transceivers 2 installed on the left- and right-front wheels 6a and 6b, through the receiving antenna 27 and the triggering signal receiving unit 25. Then, each control unit 22 is switched to a wake-up mode in response to the startup commands contained in the triggering signal, and the triggering signal intensity measuring unit 22a measures the reception intensity of the received triggering signal.

After calculating the reception intensity of the triggering signal, each transceiver 2 stores the calculated reception intensity in a frame together with the ID information assigned to the transceiver 2 for making distinction from others. Then, the transceiver 2 transmits the frame to the receiver 3. Transmission timing of the frame is differentiated between the individual transceivers 2. Accordingly, as indicated at a period T2 of FIG. 5, the frames transmitted from the individual transceivers 2 can be reliably received by the receiver 3 without causing radio interference.

Subsequently, at step 110, it is determined whether or not the two transceivers 2 have responded to the triggering signals outputted from the first triggering device 5a. The two transceivers 2 here are referred to the ones installed on the two front wheels 6a and 6b.

However, when the triggering signals are influenced by the ambient environment of the vehicle, such as when the vehicle is parked near a facility or plant emitting jamming radio waves, it is likely that the triggering signals may not be received by the transceivers 2. When at least one of the two transceivers 2 installed on the two front wheels 6a and 6b becomes unable to receive the triggering signal, the two frames may no longer be received. Thus, a determination can no longer be made as to the responses of the two transceivers 2. In this case, a negative determination is made at step 110 and control proceeds to step 120 for retrial of the above processes. At the same time, the count of a counter, not shown, incorporated in the control unit 33 is incremented by "1" to store the number of retrials.

At step 120, it is determined whether or not the number of retrials is five or less. If the number is five or less, control returns to step 100 is for retrial. If the number exceeds five, the processes are stopped without making further trial. In this case, it is considered that the transceivers 2 have failed or the battery has exhausted. Such failure or exhaustion may be ensured to be notified through the display device 4.

On the other hand, if a positive determination is made at step 110, control proceeds to step 130 and the subsequent steps. At step 130, a triggering command signal is outputted to the second triggering device 5b for the processes involving the rear wheels 6c and 6d. Thus, the same processes of steps 100 to 120 described above are performed at steps 130 to 150 for the rear wheels 6c and 6d. The description on the processes of steps 130 to 150 is omitted as they are completely the same as the processes performed for the front wheels 6a and 6b. By performing the processes of steps 130 to 150, it can be confirmed whether or not the reception intensity data of the triggering signals have been normally transmitted from the transceivers 2 installed on the two rear wheels 6c and 6d.

At step 160, wheel positions are allocated based on the reception intensity data stored in the received frames. In particular, the reception intensity data and pieces of the ID information are read out of the two frames received at step 110. The pieces of the ID information are arranged in the order of descending reception intensities. The piece of the ID information having higher reception intensity is identified as of the transceiver 2 installed on the left-front wheel 6b, and the one having lower reception intensity is identified as of the transceiver 2 installed on the right-front wheel 6a. Then, the pieces of the ID information stored in the respective frames are stored (registered) in a memory of the control unit 33, being correlated to the right-front wheel 6a and the left-front wheel 6b on which the respective transceivers 2 are installed.

Similarly, the reception intensity data and pieces of the ID information are read out of the two frames received at step 140. The pieces of the ID information are arranged in the order of descending reception intensities. The piece of the ID information having higher reception intensity is identified as of the transceiver 2 installed on the left-rear wheel 6d, and the one having lower reception intensity is identified as of the transceiver 2 installed on the right-rear wheel 6c. Then, the pieces of the ID information stored in the respective frames are stored (registered) in the memory of the control unit 33, being correlated to the right-rear wheel 6c and the left-rear wheel 6d on which the respective transceivers 2 are installed. Thus, the processes of wheel position detection are terminated.

In case of performing tire inflation pressure detection, which will be described later, the receiver 3 can first receive a frame that has stored the inflation pressure data, and then determine the transceiver 2 that has transmitted the frame from among the four transceivers 2 installed on the wheels 6a-6d, on the basis of the piece of the ID information stored in the frame. In this way, the inflation pressures of the wheels 6a-6d can be obtained. Thus, it is not necessary for the user to carry out operations, such as reading out the ID information, in order to determine one of the wheels 6a-6d, on which the transceiver 2 in question is installed.

Subsequent to the wheel position detection, the tire inflation pressure detecting apparatus carries out the tire inflation pressure detection.

In particular, the tire inflation pressure detecting apparatus is switched to a regular transmission mode. Then, in each transceiver 2, detection signals indicating an inflation pressure of the tire and a temperature in the tire are inputted from the sensing unit 21 to the control unit 22, as described above. These detection signals are then processed, as required, so as to be used as the inflation pressure data, stored in a frame together with the ID information of the transceiver 2, and transmitted to the side of the receiver 3 through the RF transmitting unit 23 in a periodical manner.

On the other hand, the frame transmitted from the transceiver 2 is received by the antenna 31 of the receiver 3 and inputted to the control unit 33 through the RF receiving unit 32. In the control unit 33, the inflation pressure data and the temperature data of the tire are extracted from the received frame. Then, as required, temperature correction is carried out on the basis of the temperature data to obtain a tire inflation pressure. In this case, the ID information stored in the frame is checked against the ID information that has been stored during the wheel position detection to determine the transceiver 2 in question that has transmitted the frame, from among the four transceivers 2 installed on the respective wheels 6a-6d.

When the change of the inflation pressure of the tire is small, or when a difference between the inflation pressures obtained this time and the previously obtained inflation pressure does not exceed a predetermined threshold, the interval of the inflation pressure detection remains as it is (e.g., every minute). When the change of the inflation pressure is large, or when the difference exceeds the predetermined threshold, the interval is shortened (e.g., every five seconds).

Eventually, when the obtained inflation pressure is determined as being lower than the predetermined threshold, a signal is outputted accordingly to the display device 4 from the control unit 33. In this case, the indication on the display device 4 is made in a manner that can identify the wheel having the tire with the reduced inflation pressure, from among the four wheels 6a-6d. In this way, the driver can be notified which of the wheels 6a-6d has the tire with reduced inflation pressure.

Finally, when the ignition switch is turned from an on-state to an off-state, the control unit 33 of the receiver 3 again outputs a triggering command signal to the triggering device 5, which in turn outputs a triggering signal containing the halt commands. When the triggering signal is inputted to the control unit 22 through the receiving antenna 27 and the triggering signal receiving unit 25, the transceiver 2 is switched to a sleep mode. Thus, the inflation pressure detection of the tire inflation pressure detecting apparatus is terminated.

According to the tire inflation pressure detecting apparatus provided with the wheel position detecting apparatus of the present embodiment, the triggering signals outputted from the first triggering device 5a for the front wheels, are adapted to reach the two transceivers 2 installed on the left- and right-front wheels 6a and 6b. Also, the triggering signals outputted from the second triggering device 5b for the rear wheels, are adapted to reach the two transceivers 2 installed on the left- and right-rear wheels 6c and 6d. Further, each of the transceivers 2 is started up (switched to a wake-up mode) by the startup commands contained in the triggering signal, and then the execution commands permit the transceiver 2 to measure the reception intensity of the triggering signal. Then, the transceivers 2 installed on the respective wheels are identified, making use of the property that the intensities of the triggering signals are more weakened as the distances become larger from the first and second triggering devices 5a and 5b to the respective transceivers 2.

In this way, the output of the triggering signals from the first and second triggering devices 5a and 5b can reliably start up the individual transceivers 2 and reliably execute the processes of wheel position detection immediately after the startup. Thus, the wheel position detection can be promptly conducted in a reliable manner without having to output the triggering signals many times. In particular, the wheel position detection can be conducted by switching each transceiver 2 from a sleep mode to a wake-up mode immediately after turning the ignition switch from an off-state to an on-state. Therefore, wheel position detection can be conducted before starting traveling, which is led to reliable tire inflation pressure detection before starting traveling.

The wheel position detecting apparatus of the present embodiment performs the wheel position detection based on the triggering signals outputted from the first and second triggering devices 5a and 5b. Therefore, comparing with the apparatus which performs wheel position detection based on the noises generated by the noise generation sources, the apparatus of the present embodiment can achieve sufficient compatibility to vehicles. In addition, the apparatus according to the present embodiment may have high flexibility in its design because the triggering signals outputted from the first and second triggering devices may only have to be reliably transmitted to the transceivers installed on the left and right wheels.

Second Embodiment

Hereinafter will be described a second embodiment of the present invention. In the first embodiment described above, the triggering signals outputted from the first triggering device 5a have been received by only the transceivers 2 installed on the left- and right-front wheels 6a and 6b, while the triggering signals outputted from the second triggering device 5b have been received by only the transceivers 2 installed on the left- and right-rear wheels 6c and 6d. However, there is a possibility that the triggering signal outputted from the first triggering device 5a may also be received by the transceiver 2 installed on the left-rear wheel 6d, or the triggering signal outputted from the second triggering device 5b may also be received by the transceiver 2 installed on the left-Front wheel 6b. The present embodiment may enable reliable wheel position detection under such conditions. A tire inflation pressure detecting apparatus provided with the wheel position detecting apparatus according to the present embodiment has a configuration similar to that of the first embodiment, but has different processes and operation. The description here will be focused on the differences.

Figure 6:
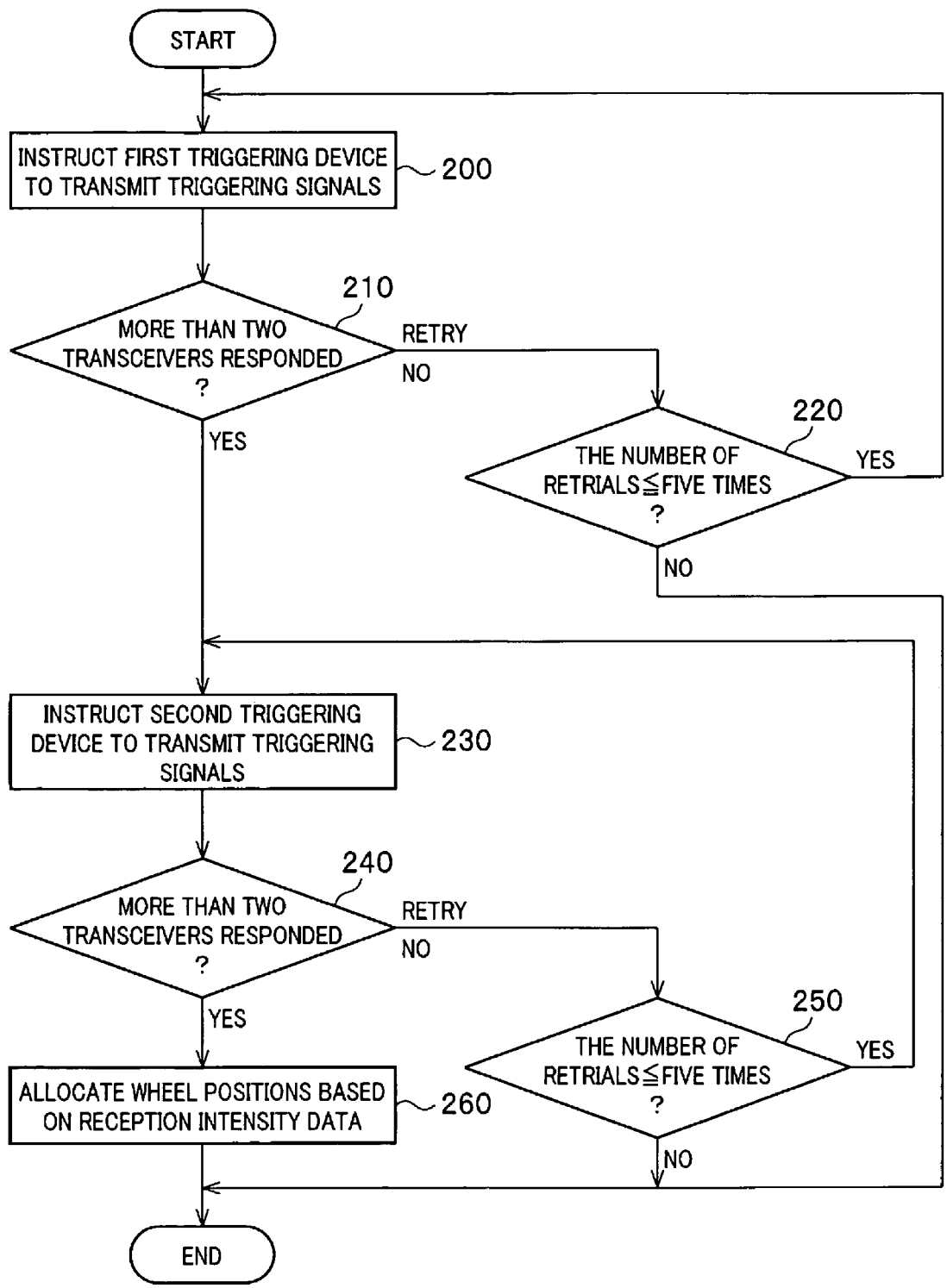
FIG. 6 is a flow diagram illustrating processes of wheel position detection executed by a control unit of each transceiver in a tire inflation pressure detecting apparatus to which a wheel position detecting apparatus according to a second embodiment of the present invention is applied.

FIG. 6 is a flow diagram illustrating processes of wheel position detection executed by the control unit 33 of the receiver 3. Referring to FIG. 6, the processes of wheel position detection executed by the tire inflation pressure detecting apparatus of the present embodiment will be described.

The processes of wheel position detection of the present embodiment are basically the same as those of the first embodiment. At step 200 to 260, substantially the same processes of wheel position detection as those of steps 100 to 160 of the first embodiment shown in FIG. 4 are executed. However, processes of steps 210, 240 and 260 are different from those of steps 110, 140 and 160.

In particular, it is determined, at step 210, whether or not more than two transceivers 2 have responded to the triggering signals outputted from the first triggering device 5a. Specifically, assuming that the triggering signals are received by more than two transceivers 2, the present embodiment is adapted to make a positive determination at this step when more than two transceivers 2 have made responses. Similarly, it is determined, at step 240, whether or not more than two transceivers 2 have responded to the triggering signals outputted from the second triggering device 5b.

At step 260, wheel positions are allocated based on the reception intensity data stored in the received frames. The allocation of the wheel positions is performed by a process different from that of the first embodiment. The concept of this wheel position allocation will be described first.

As described above, the first triggering device 5a is located so as to have different distances from the transceivers 2 installed on the four wheels 6a-6d. Also, the second triggering device 5b is located so as to have different distances from the transceivers 2 installed on the four wheels 6a-d.

Accordingly, the triggering signals outputted from the first and second triggering devices 5a and 5b are detected as having different reception intensities, at the individual transceivers 2. For example, assuming that the triggering signals outputted from the first triggering device 5a have been received by the transceivers installed on the left- and right-front wheels 6a and 6b and the left-rear wheel 6d, the reception intensities, when arranged in descending order, will be the left-front wheel 6b, the right-front wheel 6a and the left-rear wheel 6d. In this case, no triggering signal is received by the transceiver 2 for the right-rear wheel 6c which is located furthest from the first triggering device 5a. As a matter of course, the frames transmitted from the transceivers 2 for the wheels other than the right-rear wheel 6c contain different reception intensity data. Depending on the ambient environment, it may sometimes happen that the transceiver 2 of the right-rear wheel 6c receives the triggering signal from the first triggering device 5a. In this case, the reception intensity at this transceiver 2 will be the lowest.

Although the distances from the first triggering device 5a to the individual transceivers 2 are differentiated, the difference is not large between the distances from the triggering device 5a to the transceivers 2 installed on the right-front wheel 6a and the left-rear wheel 6d. Accordingly, the difference may not also be large between the reception intensities of the triggering signals received by these transceivers 2. Therefore, wheel position detection using the triggering signals only from the first triggering device 5a, may sometimes raise difficulty in determining the correlation of the transceivers 2 that have transmitted the frames, with the right-front wheel 6a and the left-rear wheel 6d.

To take a measure for this, the present embodiment allows the receiver 3 to further output a triggering command signal to the second triggering device 5b, so that triggering signals are outputted from the second triggering device 5b.

The triggering signals are thus received by the individual transceivers 2. Since the second triggering device 5b is located at a position different from that of the first triggering device 5a, the reception intensities of the triggering signals received by the individual transceivers 2 are different from those of the triggering signals outputted from the first triggering device 5a. Specifically, the reception intensities of the triggering signals outputted from the second triggering device 5b and received by the transceivers 2 for the wheels 6a-6d, when arrange in descending order, will be the left-rear wheel 6d, the right-rear wheel 6c and the left-rear wheel 6b. In this case, no triggering signal is received by the transceiver 2 for the right-front wheel 6a located furthest from the second triggering device 5b. Depending on the ambient environment, it may sometimes happen that the transceiver 2 of the right-front wheel 6a receives the triggering signal from the second triggering device 5b. In this case, the reception intensity at this transceiver 2 will be the lowest.

In this way, the reception intensities of the triggering signals received by the individual transceivers 2 are different between the case of the first triggering device 5a and the case of the second triggering device 5b.

Under such circumstances, as to the case of the first triggering device 5a, the transceiver 2 that has transmitted the frame containing the highest reception intensity data is identified as being of the left-front wheel 6b. Further, each of the transceivers 2, which have transmitted the frames containing the secondly and thirdly highest reception intensity data, is specified as being either of the right-front wheel 6a or the left-rear wheel 6d.

Then, as to the case of the second triggering device 5b, the transceiver 2 that has transmitted the frame containing the highest reception intensity data is identified as being of the left-rear wheel 6d. Further, each of the transceivers 2, which have transmitted the frames containing the secondly and thirdly highest reception intensity data, is specified as being either of the right-rear wheel 6c or the left-front wheel 6b.

In summary, for the first triggering device 5a, it may not be possible to determine the correlation of the transceivers 2 that have sent the frames containing the secondly and thirdly highest reception data, with the right-front wheel 6a and the left-rear wheel 6d. Meanwhile, for the second triggering device 5b, the transceiver 2 that has sent the frame containing the highest reception intensity data can be identified as being of the left-rear wheel 6d. As a result, the transceiver 2 that has sent the frame containing the secondly highest reception intensity data for the first triggering device 5a can be identified as being of the right-front wheel 6a. Based on the reverse concept, the transceiver 2 that has sent the frame containing the secondly highest reception intensity data for the second triggering device 5b can be identified as being of the right-rear wheel 6c.

The processes of determining the correlation between the individual transceivers 2 and the four wheels in the present embodiment will be fully understood from the following description.

Figure 7A:
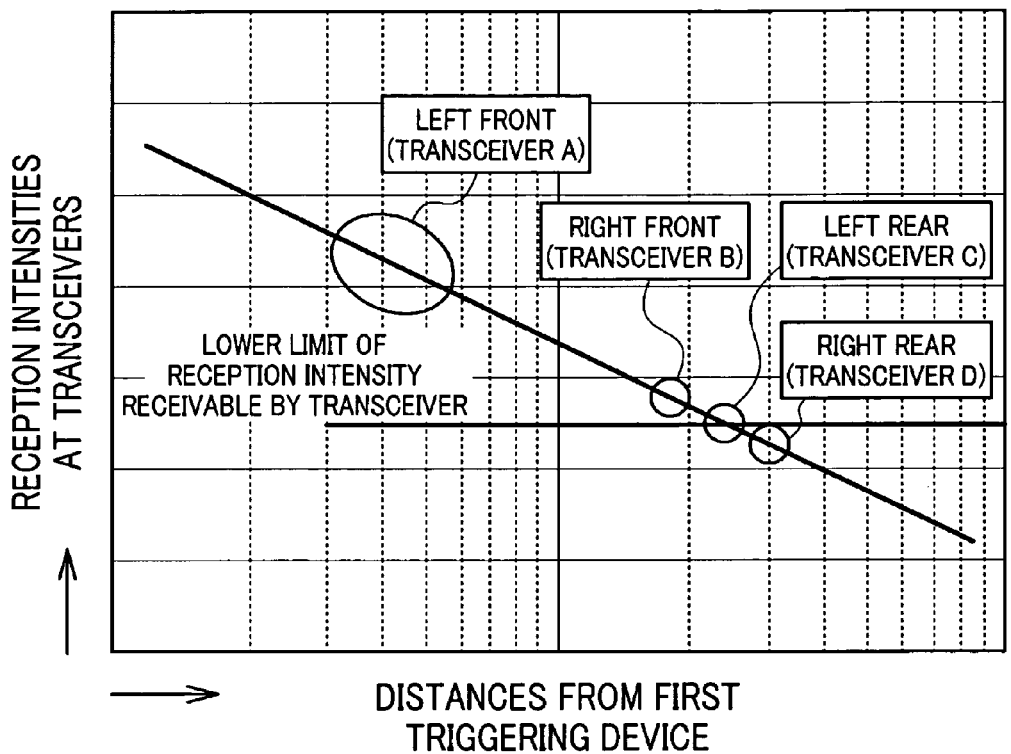
FIG. 7A illustrates a relationship between the distances from a first triggering device to the associated transceivers, the intensities of triggering signals, and the reception sensitivities of the associated transceivers.
Figure 7B:
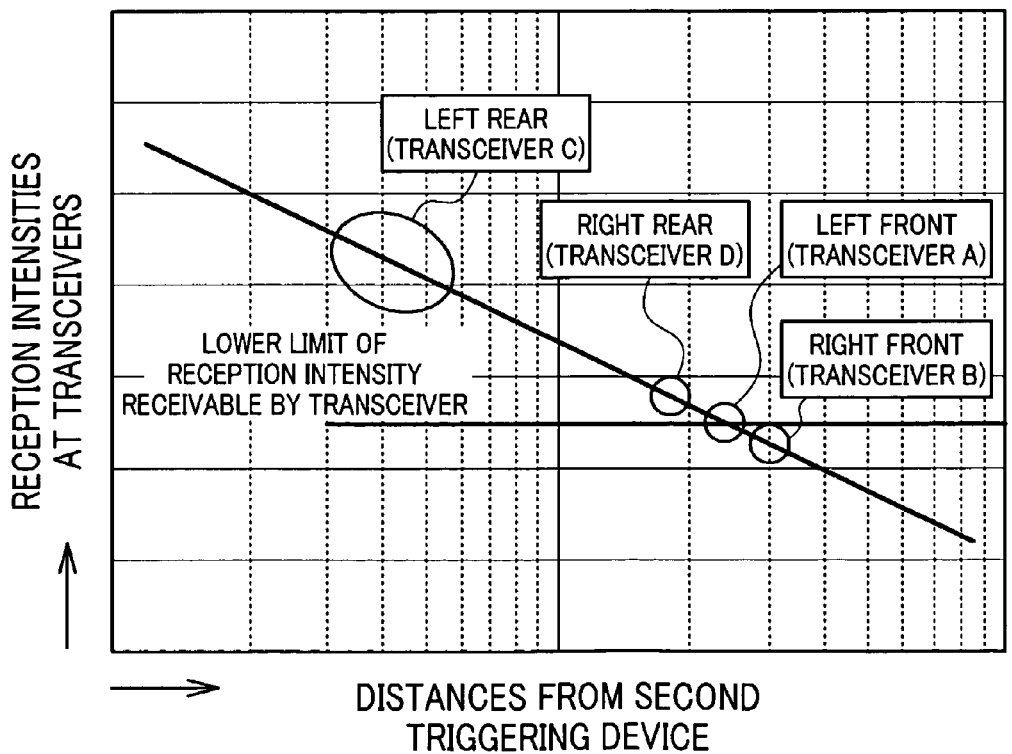
FIG. 7B illustrates a relationship between the distances from a second triggering device to the associated transceivers, the intensities of triggering signals, and the reception sensitivities of the associated transceivers.

FIG. 7A illustrates a relationship between the distances from first triggering device 5a to the transceivers 2, the intensities of the triggering signals, and the reception sensitivities of the transceivers 2. FIG. 7B illustrates a relationship between the distances from second triggering device 5b to the transceivers 2, the intensities of the triggering signals, and the reception sensitivities of the transceivers 2. FIG. 7A shows a state that the triggering signals outputted from the first triggering device 5a have been received by the transceivers 2 installed on the left-front wheel 6b, the right-front wheel 6a and the left-rear wheel 6d. FIG. 7B shows a state that the triggering signals outputted from the second triggering device 5b have been received by the transceivers 2 installed on the left-rear wheel 6d, the right-rear wheel 6c and the left-front wheel 6b.

Figure 8:
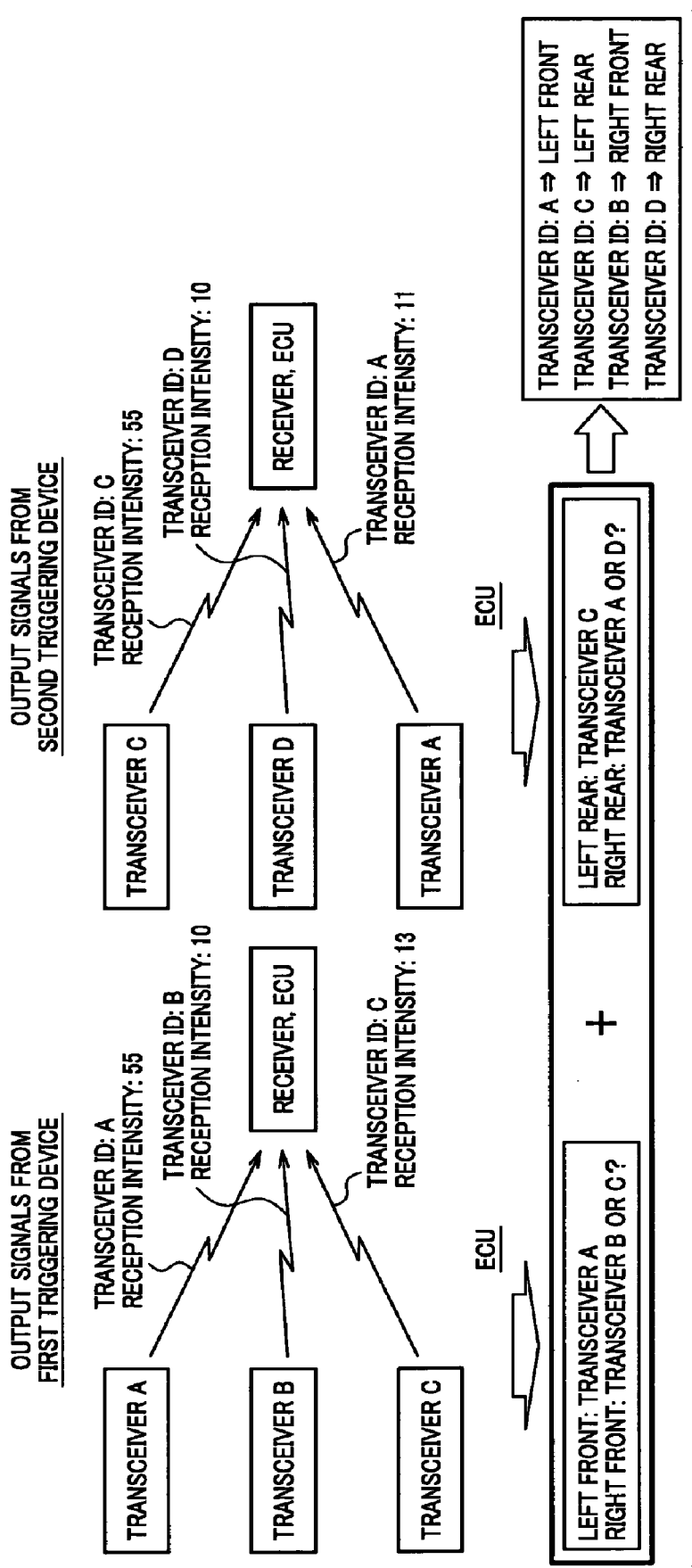
FIG. 8 illustrates a flow for determining correlation of individual transceivers with the respective wheels.

FIG. 8 illustrates a flow for determining correlation of the individual transceivers 2 with the wheels 6a-6d in the above states.

Referring to FIG. 8, the flow will now be explained. First, triggering signals are outputted from the first triggering device 5a. The triggering signals are received by three transceivers A to C and not received by the transceiver D. Then, each of the transceivers A to C stores reception intensity data of the received triggering signal in a frame together with the ID information of the transceiver itself, and transmits the frame to the receiver 3. No frame is transmitted to the receiver 3 from the transceiver D.

Subsequently, the second triggering device 5b outputs triggering signals. The triggering signals are received by three transceivers A, C and D and not received by the transceiver B. Then, each of the transceivers A, C and D stores reception intensity data of the received triggering signal in a frame together with the ID information of the transceiver itself and transmits the frame to the receiver 3. No frame is transmitted to the receiver 3 from the transceiver B.

Subsequently, based on the reception intensity data stored in the frames that have been transmitted to the receiver 3 from the individual transceivers 2, it is identified, first, that the transceiver A having the highest reception intensity value for the triggering signal of the first triggering device 5a, is installed on the left-front wheel 6b. Then, each of the remaining two transceivers B and C are specified as being installed on either the right-front wheel 6a or the left-rear wheel 6d. Similarly, it is identified that the transceiver C having the highest reception intensity value for the triggering signal of the second triggering device 5b, is installed on the left-rear wheel 6d. Then, each of the remaining two transceivers A and D are specified as being installed on either the right-rear wheel 6c or the left-front wheel 6b. Since the transceiver A has already been identified as being installed on the left-front wheel 6b, the transceiver D can be identified as being installed on the right-rear wheel 6c. Thus, the transceiver B can ultimately be identified as being installed on the right-front wheel 6a.

As described above, the tire inflation pressure detecting apparatus provided with the wheel position detecting apparatus according to the present invention can cope with the case where the triggering signals outputted from the first triggering device 5a or the second triggering device 5b are received by more than two transceivers 2. That is, the apparatus according to the present embodiment can determine the correlation of the individual transceivers 2 with the wheels 6a-6d on which the transceivers 2 are installed, by utilizing the different reception intensities at the individual transceivers 2 with respect to the triggering signals issued from each of the first and second triggering devices 5a and 5b.

In this way, comparing with the first embodiment, the present embodiment can more accurately determine the correlation of the individual transceivers 2 with the wheels 6a-6d on which the transceivers 2 are installed.

The present embodiment has been described assuming that the triggering signals from one triggering device are received by three wheels among the four wheels. As described in the first embodiment, however, in the case where the triggering signals are received by only two wheels, simple and accurate identification can be ensured for the individual transceivers 2. Depending on the ambient environment, however, the triggering signals may sometimes be received by more than two transceivers 2. Therefore, preferably, the mode of the present embodiment is used by setting the output intensities of the triggering signals or the reception sensitivities of the transceivers 2 so as to allow the triggering signals to be normally received by only two wheels. Then, preferably, the mode of the present embodiment is utilized in the case where the triggering signals have been received by more than two transceivers 2 due to the change of the ambient environment, to avoid incorrect detection of the wheel positions.

Third Embodiment

Hereinafter will be described a third embodiment of the present invention. The third embodiment is different from the first embodiment in that it has another arrangement of the first and second triggering devices 5a and 5b.

Figure 9:
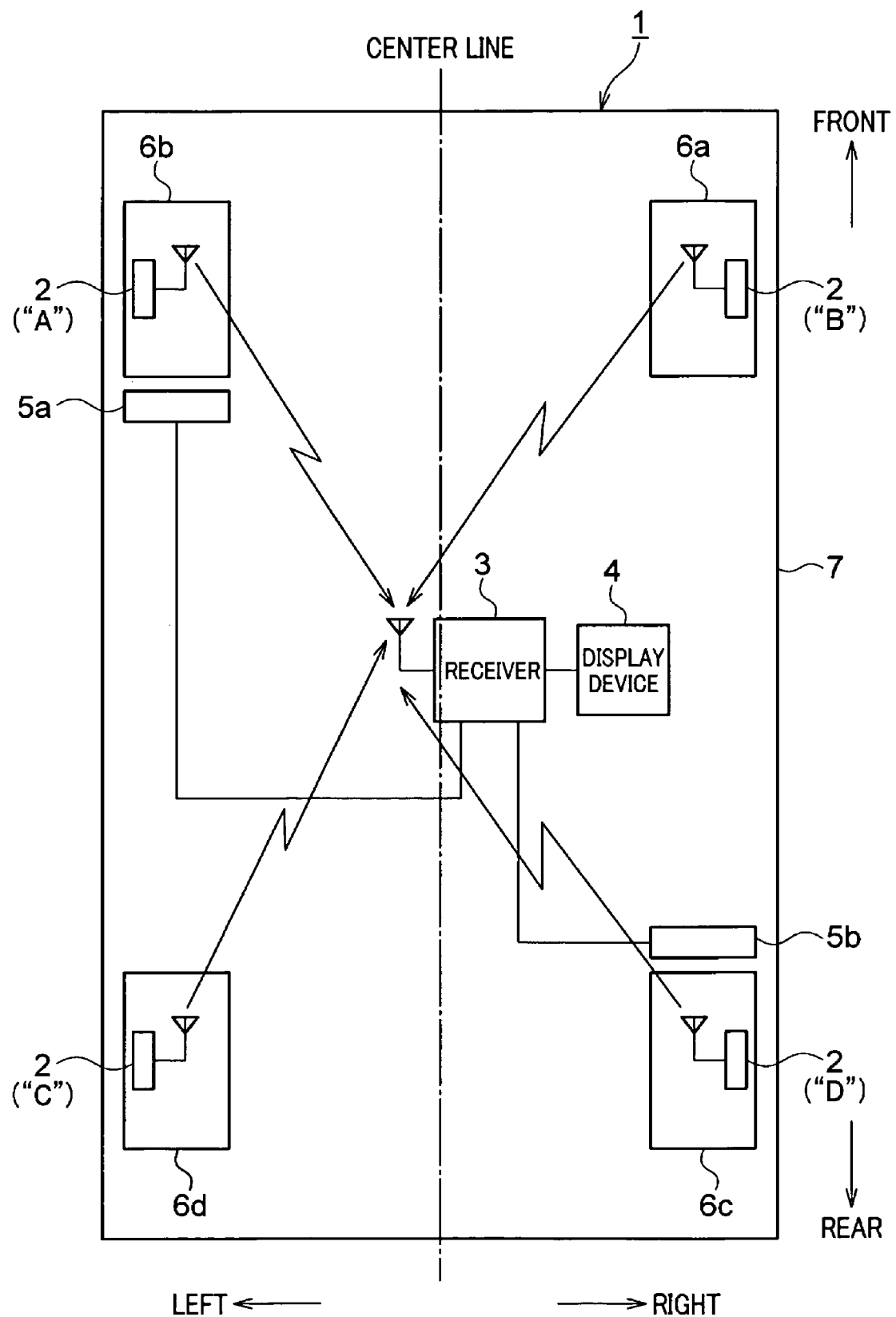
FIG. 9 is a block diagram generally illustrating a tire inflation pressure detecting apparatus to which a wheel position detecting apparatus according to a third embodiment of the present invention is applied.

FIG. 9 is a pattern diagram illustrating an arrangement of the first and second triggering devices 5a and 5b. As shown in the figure, the first triggering device 5a is arranged, as in the first embodiment, being offset from the center line of the vehicle 1 and being closer to the left-front wheel 6b than to the right-front wheel 6a. The second triggering device 5b is arranged also being offset from the center line of the vehicle 1 but, unlike the first embodiment, being closer to the right-rear wheel 6c than to the left-rear wheel 6d. Specifically, it is so arranged that a diagonal positional relationship is established between the left-front wheel 6b in the two front wheels 6a and 6b, which is located close to the first triggering device 5a, and the right-rear wheel 6c in the two rear wheels 6c and 6d, which is located close to the second triggering device 5b.

As described above, triggering signals can be simultaneously outputted from the first triggering device 5a for the front wheels and the second triggering device 5b for the rear wheels. Then, the transceivers 2 installed on the left- and right-front wheels 6a and 6b can receive only the triggering signals outputted from the first triggering device 5a. Similarly, the transceivers 2 installed on the left- and right-rear wheels 6c and 6d can receive only the triggering signals outputted from the second triggering device 5b. In this way, the transceivers 2 installed on the two front wheels 6a and 6b can be identified by the triggering signals outputted from the first triggering device 5a. Similarly, the transceivers 2 installed on the two rear wheels 6c and 6d can be identified by the triggering signals outputted from the second triggering device 5b. Accordingly, the positional relationship between the first and second triggering devices 5a and 5b can be uniquely established without the necessity of considering the mutual positional relationship. Thus, the arrangement of the present embodiment can achieve the advantages similar to those of the first embodiment.

This mode of arrangement in which the triggering devices 5a and 5b are disposed on both of the left and right sides, respectively, may balance the weight of the triggering devices 5a and 5b and wire harnesses linked thereto, between the left and right of the vehicle 1. Thus, the weight of the vehicle 1 can be well balanced between left and right. In case of the door control based on a smart entry system, the door control is performed by allowing a triggering device provided in the vehicle 1 to output a triggering signal, and allowing a smart key possessed by the user to output a check signal when the smart key has received the triggering signal. In this case, the vehicle 1 is required to be provided with the triggering device on both the left and right sides. In this regard, the first and second triggering devices of the present embodiment, which are disposed left and right of the vehicle 1, can also serve as the triggering devices for outputting triggering signals in the smart entry system. Drawing the wire harnesses from the receiving unit 3 to the triggering device 5 may often be limited due to the convenience (e.g., arrangement of other parts) of the vehicle 1. In this case as well, the first and second triggering devices 5a and 5b can be positioned in conformity with the convenience of the vehicle 1.

Fourth Embodiment

Figure 10:
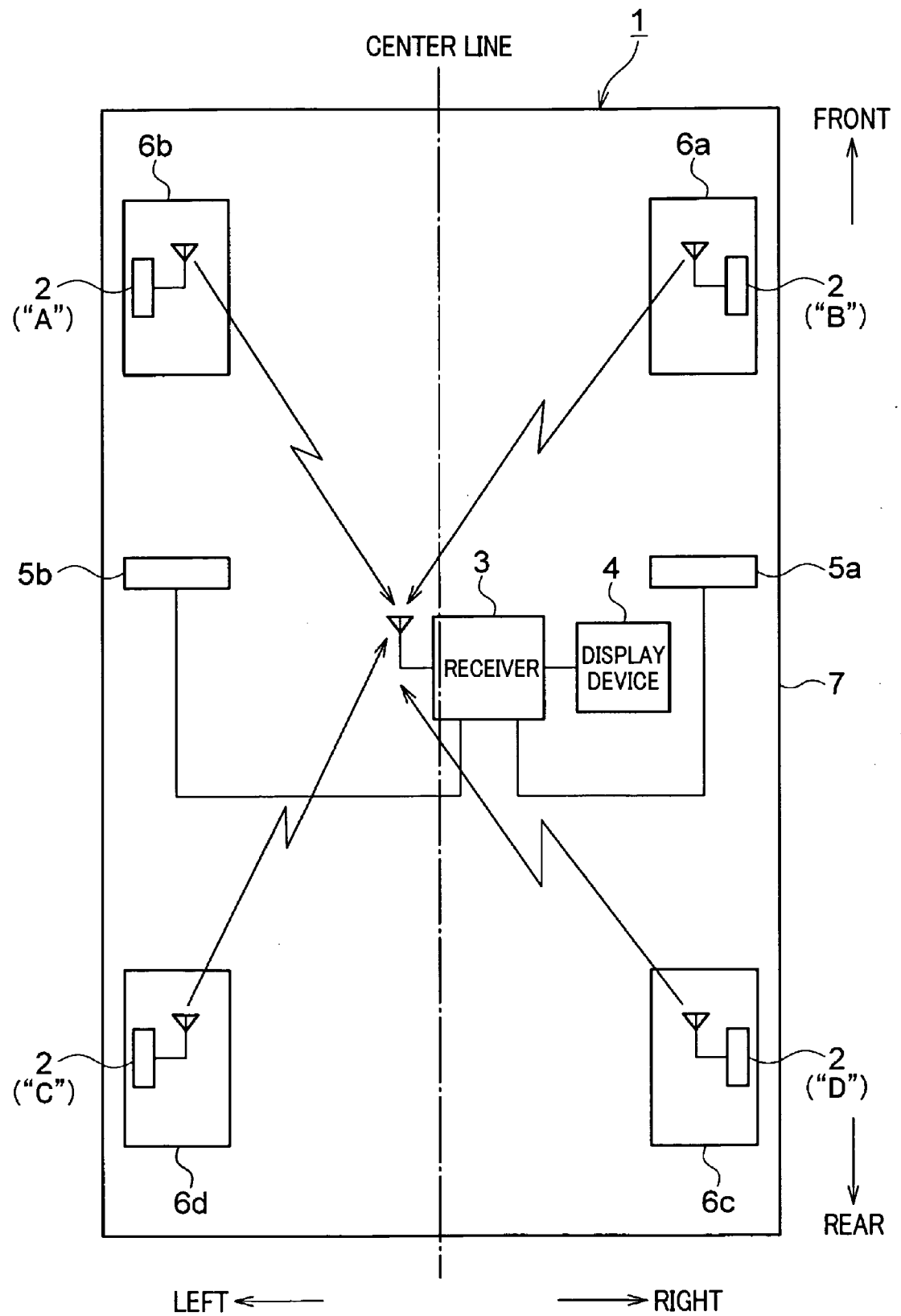
FIG. 10 is a block diagram generally illustrating a tire inflation pressure detecting apparatus to which a wheel position detecting apparatus according to a fourth embodiment of the present invention is applied.

Hereinafter will be described a fourth embodiment of the present invention. The fourth embodiment is also different from the first embodiment in that it has still another arrangement of the first and second triggering devices 5a and 5b. FIG. 10 is a pattern diagram illustrating an arrangement of the first and second triggering devices 5a and 5b, according to the present embodiment.

In the above embodiments, the first triggering device 5a has been arranged on the side of the two front wheels 6a and 6b, while the second triggering device 5b has been arranged on the side of the two rear wheels 6c and 6d. Thus, the first triggering device 5a has been adapted to output the triggering signals toward a pair of the left- and right-front wheels 6a and 6b. Similarly, the second triggering device 5b has been adapted to output the triggering signals toward a pair of the left- and right-rear wheels 6c and 6d.

On the other hand, as shown in FIG. 10, the first triggering device 5a may be disposed on the side of the two right wheels 6a and 6c, and the second triggering device 5b may be disposed on the side of the two left wheels 6b and 6d. In this way, a pair of the right wheels 6a and 6c may be adapted to receive the triggering signals only from the first triggering device 5a, and a pair of the left wheels 6b and 6d may be adapted to receive the triggering signals only from the second triggering device 5b. In this case, the first triggering device 5a can be disposed being closer to one of the right wheels 6a and 6c than to the other, and the second triggering device 5b may be disposed being closer to one of the left wheels 6b and 6d than to the other. Thus, the reception intensities can be differentiated between the triggering signals outputted from each of the first and second triggering devices 5a and 5b to thereby attain the same advantages as in the above embodiments. Further, the triggering signals outputted from the first triggering device 5a may be provided with information (left-or-right information) indicating that the triggering signals in question are for the right wheels. Similarly, the triggering signals outputted from the first triggering device 5b may be provided with information (left-or-right information) indicating that the triggering signals in question are for the left wheels. In this way, the individual transceivers 2 can identify whether the wheels they are installed on are the two right wheels 6a and 6c or the two left wheels 6b and 6d.

Thus, even when the arrangement of the first and second triggering devices 5a and 5b is changed, each of the transceivers 2 can identify on which of the four wheels 6a-6d the transceiver 2 in question is installed, on the basis of the triggering command of the triggering signal outputted from the triggering device 5 and the reception intensity. As a result, the advantages similar to those of the first embodiment can be achieved.

Other Embodiments

The embodiments described above have included the antenna 31 that serves as a single antenna shared between the transceivers. Alternative to this, four antennas may be provided for the respective wheels 6a-6d. However, the present embodiment can be effectively applied in the case where the antenna 31 is used as a single antenna shared between the transceivers because, in this case, it becomes particularly difficult to specify the wheels 6a-6d on which the transceivers 2 are installed.

The embodiments described above have been configured to perform the wheel position detection after the lapse of a predetermined period from when the ignition switch has been turned from an off-state to an on-state. Therefore, even when the tires of the vehicle 1 appear to be in normal conditions, it is possible to detect the already caused blowout or the abnormally reduced inflation pressure of the tires before the driver drives the vehicle 1. However the wheel position detection may be conducted on the occasion other than this. For example, the detection may be conducted after rotating the positions of the tires or after changing the tires. The fact of rotating the positions of the tires or changing the tires can be detected by detecting an inclination of the vehicle body 7. The inclination can be detected, for example, by depressing a switch, not shown, for the wheel position detection, or by setting an inclination sensor at the vehicle body.

The embodiment 1 has indicated a case where the first and second triggering devices 5a and 5b are both disposed on the left side of the vehicle 1. The triggering devices, however, may alternatively be disposed on the right side. Further, the second embodiment has indicated a case where the first triggering device 5a is disposed on the side of the left-front wheel 6b and the second triggering device 5b is disposed on the side of the right-rear wheel 6c. Alternatively, however, the first triggering device 5a may be disposed on the side of the right-front wheel 6a and the second triggering device 5b may be disposed on the side of the left-rear wheel 6d.

In each of the above embodiments described above, the embodiment has been applied to a four-wheel vehicle. However, the application is not limited to a four-wheel vehicle. For example, the present invention can also be applied to a wheel position detecting apparatus and a tire inflation pressure detecting apparatus for those vehicles which have four or more wheels, such as heavy vehicles.

What is claimed is:

1. An apparatus for detecting positions of a plurality of wheels of a vehicle, the plurality of wheels being attached to a body of the vehicle and including right and left front wheels and right and left rear wheels, comprising:

a plurality of transceivers attached to the front and rear four wheels, respectively, each of the transceivers being configured to receive a triggering signal, calculate a reception intensity of the triggering signal, store data indicating the reception intensity into a frame to be transmitted, and transmit the frame;

a plurality of triggering devices attached to the body of the vehicle and including i) a first triggering device located at a position closer to the two front wheels than the two rear wheels, the position providing mutually different distances from the right front wheel and the left front wheel, and configured to output the triggering signal which reaches at least two transceivers of the transceivers which are attached to the right and left front wheels and ii) a second triggering device located at a position closer to the two rear wheels than the two front wheels, the position providing mutually different wheels from the right rear wheel and the left rear wheel, and configured to output a triggering signal which reaches at least two transceivers of the transceivers which are attached to the right and left rear wheels, each of the triggering signals from the first and second triggering devices containing a startup command and an execution command, and a receiver attached to the body and configured to i) output a command signal which allows the first and second triggering devices to output the triggering signal, ii) receive the frame transmitted from the transceivers, and iii) processes the received frame to detect the positions of the wheels using the data indicating the reception intensity, wherein the transceivers attached to the right and left front wheels are configured to start up in response to the startup command, when the triggering signal is received from the first triggering device and calculate the reception intensity in response to the execution command;

the transceivers attached to the right and left rear wheels are configured to start up in response to the startup command, when the triggering signal is received from the second triggering device and calculate the reception intensity in response to the execution command; and the receiver is configured to i) use an amplitude of the reception intensity stored in the frame transmitted from the transceivers attached to the right and left front wheels to determine which front-wheel-side transceiver is attached to which of the right and left front wheels and ii) use an amplitude of the reception intensity stored in the frame transmitted from the transceivers attached to the right and left rear wheels to determine which rear-wheel-side transceiver is attached to which of the right and left rear wheels, whereby the positions of the four wheels are detected.

2. The apparatus of claim 1, wherein both of the first and second triggering devices are positionally offset onto the same right or left side of the body divided into right and left areas by a body center line extending along a longitudinal direction of the body.

3. The apparatus of claim 2, wherein the receiver is configured to
   i) determine, of the right and left front wheels, which wheel is positionally nearer to the first triggering device than the other wheel based on the data stored in the frames transmitted from the transceivers, when the first triggering device outputs the triggering signal,
   ii) determine, of the right and left rear wheels, which wheel is positionally nearer to the second triggering device than the other wheel based on the data stored in the frames transmitted from the transceivers, when the second triggering device outputs the triggering signal, and
   iii) determine, of the right and left front wheels, which wheel is positionally farther from the first triggering device than the other wheel and, of the right and left rear wheels, which wheel is positionally farther from the second triggering device than the other wheel, based on both the data stored in the frames transmitted from the transceivers when the first triggering device outputs the triggering signal and the data stored in the frames transmitted from the transceivers when the second triggering device outputs the triggering signal.

4. The apparatus of claim 1, wherein the receiver comprises means for providing the command signal to the first and second triggering devices when an ignition switch of the vehicle is turned on.

5. The apparatus of claim 4, wherein the receiver comprises means for providing the command signal to the first and second triggering devices when an ignition switch of the vehicle is turned off, wherein the triggering signal provided when the ignition-switch is turned off includes a halt command to halt operations of the transceivers.

6. The apparatus of claim 1, wherein the respective transceivers attached to the respective wheels are configured to transmit the frame at transmission timings that are different from one another among the transceivers, when each transceiver receives the triggering signal.

7. The apparatus of claim 6, wherein each of the respective transceivers comprises means for deciding the transmission timings depending on the reception intensity of the received triggering signal, when each transceiver receives the triggering signal.

8. The apparatus of claim 6, wherein each of the respective transceivers comprises means for deciding the transmission timings at random, when each transceiver receives the triggering signal.

9. An apparatus for detecting positions of a plurality of wheels of a vehicle, the plurality of wheels being attached to a body of the vehicle and including right front and rear wheels and left front and rear wheels, comprising:

a plurality of transceivers attached to the front and rear four wheels, respectively, each of the transceivers being configured to receive a triggering signal, calculate a reception intensity of the triggering signal, store data indicating the reception intensity into a frame to be transmitted, and transmit the frame;

a plurality of triggering devices attached to the body of the vehicle and including i) a first triggering device located at a position closer to the two right wheels than the two left wheels, the position providing mutually different distances from the right front wheel and the right rear wheel, and configured to output the triggering signal which reaches at least two transceivers of the transceivers which are attached to the right front and rear wheels and ii) a second triggering device located at a position closer to the two left wheels than the two right wheels, the position providing mutually different wheels from the left front wheel and the left rear wheel, and configured to output a triggering signal which reaches at least two transceivers of the transceivers which are attached to the left front and rear wheels, each of the triggering signals from the first and second triggering devices containing a startup command and an execution command, and a receiver attached to the body and configured to i) output a command signal which allows the first and second triggering devices to output the triggering signal, ii) receive the frame transmitted from the transceivers, and iii) processes the received frame to detect the positions of the wheels using the data indicating the reception intensity, wherein the transceivers attached to the right front and rear wheels are configured to start up in response to the startup command, when the triggering signal is received from the first triggering device and calculate the reception intensity in response to the execution command;

the transceivers attached to the left front and rear wheels are configured to start up in response to the startup command, when the triggering signal is received from the second triggering device and calculate the reception intensity in response to the execution command; and the receiver is configured to i) use an amplitude of the reception intensity stored in the frame transmitted from the transceivers attached to the right front and rear wheels to determine which right-wheel-side transceiver is attached to which of the right front and rear wheels and ii) use an amplitude of the reception intensity stored in the frame transmitted from the transceivers attached to the left front and rear wheels to determine which leftwheel-side transceiver is attached to which of the left front and rear wheels, whereby the positions of the four wheels are detected.

10. The apparatus of claim 4, wherein both of the first and second triggering devices are positionally offset onto the same front or rear side of the body divided into front and rear areas by a body center line extending along a lateral direction of the body.

11. The apparatus of claim 10, wherein the receiver is configured to
   i) determine, of the right front and rear wheels, which wheel is positionally nearer to the first triggering device than the other wheel based on the data stored in the frames transmitted from the transceivers, when the first triggering device outputs the triggering signal,
   ii) determine, of the left front and rear wheels, which the wheel is positionally nearer to the second triggering device than the other wheel based on the data stored in the frames transmitted from the transceivers, when the second triggering device outputs the triggering signal, and
   iii) determine, of the right front and left wheels, which wheel is positionally farther from the first triggering device than the other wheel and, of the left front and rear wheels, which wheel is positionally farther from the second triggering device than the other wheel, based on both the data stored in the frames transmitted from the transceivers when the first triggering device outputs the triggering signal and the data stored in the frames transmitted from the transceivers when the second triggering device outputs the triggering signal.

12. The apparatus of claim 9, wherein the receiver comprises means for providing the command signal to the first and second triggering devices when an ignition switch of the vehicle is turned on.

13. The apparatus of claim 12, wherein the receiver comprises means for providing the command signal to the first and second triggering devices when an ignition switch of the vehicle is turned off, wherein the triggering signal provided when the ignition switch is turned off includes a halt command to halt operations of the transceivers.

14. The apparatus of claim 9, wherein the respective transceivers attached to the respective wheels are configured to transmit the frame at transmission timings that are different from one another among the transceivers, when each transceiver receives the triggering signal.

15. The apparatus of claim 14, wherein each of the respective transceivers comprises means for deciding the transmission timings depending on the reception intensity of the received triggering signal, when each transceiver receives the triggering signal.

16. The apparatus of claim 14, wherein each of the respective transceivers comprises means for deciding the transmission timings at random, when each transceiver receives the triggering signal.

17. An apparatus for detecting inflation pressure of tires provided at a plurality of wheels of a vehicle, the wheels including right and left front wheels and right and left rear wheels and being attached to a body of the vehicle, comprising:
   a plurality of transceivers attached to the front and rear four wheels, respectively, each of the transceivers being configured to receive a triggering signal, calculate a reception intensity of the triggering signal, sense inflation pressure of each tire and output a sensing signal indicative of the inflation pressure, store data indicating the reception intensity and the sensing signal into a frame to be transmitted, and transmit the frame;
   a plurality of triggering devices attached to the body of the vehicle and including i) a first triggering device located at a position closer to the two front wheels than the two rear wheels, the position providing mutually different distances from the right front wheel and the left front wheel, and configured to output the triggering signal which reaches at least two transceivers of the transceivers which are attached to the right and left front wheels and ii) a second triggering device located at a position closer to the two rear wheels than the two front wheels, the position providing mutually different wheels from the right rear wheel and the left rear wheel, and configured to output a triggering signal which reaches at least two transceivers of the transceivers which are attached to the right and left rear wheels, each of the triggering signals from the first and second triggering devices containing a startup command and an execution command, and
   a receiver attached to the body and configured to i) output a command signal which allows the first and second triggering devices to output the triggering signal, ii) receive the frame transmitted from the transceivers, iii) processes the received frame to detect the positions of the wheels using the data indicating the reception intensity, and iv) calculate the inflation pressure of each tire based on the sensing signal stored in the frame;
   wherein the transceivers attached to the right and left front wheels are configured to start up in response to the startup command, when the triggering signal is received from the first triggering device and calculate the reception intensity in response to the execution command;
   the transceivers attached to the right and left rear wheels are configured to start up in response to the startup command, when the triggering signal is received from the second triggering device and calculate the reception intensity in response to the execution command; and
   the receiver is configured to i) use an amplitude of the reception intensity stored in the frame transmitted from the transceivers attached to the right and left front wheels to determine which front-wheel-side transceiver is attached to which of the right and left front wheels and ii) use an amplitude of the reception intensity stored in the frame transmitted from the transceivers attached to the right and left rear wheels to determine which rear-wheel-side transceiver is attached to which of the right and left rear wheels, whereby the positions of the four wheels are detected.

18. An apparatus for detecting inflation pressure of tires provided at a plurality of wheels of a vehicle, the wheels including right front and rear wheels and left front and rear wheels and being attached to a body of the vehicle, comprising:
   a plurality of transceivers attached to the front and rear four wheels, respectively, each of the transceivers being configured to receive a triggering signal, calculate a reception intensity of the triggering signal, sense inflation pressure of each tire and output a sensing signal indicative of the inflation pressure, store data indicating the reception intensity and the sensing signal into a frame to be transmitted, and transmit the frame;
   triggering devices attached to the body of the vehicle and including i) a first triggering device located at a position closer to the two right wheels than the two left wheels, the position providing mutually different distances from the right front wheel and the right rear wheel, and configured to output the triggering signal which reaches at least two transceivers of the transceivers which are attached to the right front and rear wheels and ii) a second triggering device located at a position closer to the two left wheels than the two right wheels, the position providing mutually different wheels from the left front wheel and the left rear wheel, and configured to output a triggering signal which reaches at least two transceivers of the transceivers which are attached to the left front and rear wheels, each of the triggering signals from the first and second triggering devices containing a startup command and an execution command, and a receiver attached to the body and configured to i) output a command signal which allows the first and second triggering devices to output the triggering signal, ii) receive the frame transmitted from the transceivers, iii) processes the received frame to detect the positions of the wheels using the data indicating the reception intensity, and iv) calculate the inflation pressure of each tire based on the sensing signal stored in the frame;

wherein the transceivers attached to the right front and rear wheels are configured to start up in response to the startup command, when the triggering signal is received from the first triggering device and calculate the reception intensity in response to the execution command;

the transceivers attached to the left front and rear wheels are configured to start up in response to the startup command, when the triggering signal is received from the second triggering device and calculate the reception intensity in response to the execution command; and the receiver is configured to i) use an amplitude of the reception intensity stored in the frame transmitted from the transceivers attached to the right front and rear wheels to determine which right-wheel-side transceiver is attached to which of the right front and rear wheels and ii) use an amplitude of the reception intensity stored in the frame transmitted from the transceivers attached to the left front and rear wheels to determine which left-wheel-side transceiver is attached to which of the left front and rear wheels, whereby the positions of the four wheels are detected.

19. A transceiver attached to each of a plurality of wheels of a body of a vehicle, the plurality of wheels including front and rear four wheels of the vehicle, comprising:

a receiving unit that receives a triggering signal transmitted from a triggering device provided at the body, the triggering signal containing a startup command and an execution command and being transmitted at timing controlled by a control unit provided at the body;

a processing unit that starts up in response to the startup command contained in the received triggering signal, calculates a reception intensity of the received triggering signal in response to the execution command contained in the received triggering signal, and store data indicating the calculated reception intensity into a frame of the data to be transmitted; and a transmitting unit that transmits the frame of data toward the body of the wheel.

20. A receiver attached to a body of a vehicle provided with a plurality of wheels including right and left front wheels and right and left rear wheels, comprising:

a receiving unit that receives frames to be transmitted from a plurality of transceivers attached to the right and left four wheels, each of the frames containing data indicating a reception intensity of a triggering signal received at each wheel; and a processing unit comprising means for commanding, by using a command signal, a first triggering device and a second triggering device to radio-transmit the triggering signal containing a startup command and an execution command toward the right and left front wheels and the right and left rear wheels, respectively, the startup command causing the transceivers to start up and the execution command causing the transceivers to calculate the reception intensity of the triggering signal;

means for receiving the four frames transmitted from the transceivers at the front and rear four wheels; and processing means for i) using an amplitude of the reception intensity stored in the frame transmitted from the transceivers attached to the right and left front wheels to determine which front-wheel-side transceiver is attached to which of the right and left front wheels and ii) using an amplitude of the reception intensity stored in the frame transmitted from the transceivers attached to the right and left rear wheels to determine which rear-wheel-side transceiver is attached to which of the right and left rear wheels, whereby the positions of the four wheels are detected.

21. The receiver of claim 20, wherein the processing means comprises means for i) determining, of the right and left front wheels, which wheel is positionally nearer to the first triggering device than the other wheel based on the data stored in the frames transmitted from the transceivers, when the first triggering device outputs the triggering signal, means for ii) determining, of the right and left rear wheels, which wheel is positionally nearer to the second triggering device than the other wheel based on the data stored in the frames transmitted from the transceivers, when the second triggering device outputs the triggering signal, and means for iii) determining, of the right and left front wheels, which wheel is positionally farther from the first triggering device than the other wheel and, of the right and left rear wheels, which wheel is positionally farther from the second triggering device than the other wheel, based on both the data stored in the frames transmitted from the transceivers when the first triggering device outputs the triggering signal and the data stored in the frames transmitted from the transceivers when the second triggering device outputs the triggering signal.

22. A receiver attached to a body of a vehicle provided with a plurality of wheels including right front and rear wheels and left front and rear wheels, comprising:

a receiving unit that receives frames to be transmitted from a plurality of transceivers attached to the right and left four wheels, each of the frames containing data indicating a reception intensity of a triggering signal received at each wheel; and a processing unit comprising means for commanding, by using a command signal, a first triggering device and a second triggering device to radio-transmit the triggering signal containing a startup command and an execution command toward the right front and rear wheels and the left front and rear wheels, respectively, the startup command causing the transceivers to start up and the execution command causing the transceivers to calculate the reception intensity of the triggering signal;

means for receiving the four frames transmitted from the transceivers at the front and rear four wheels; and processing means for i) using an amplitude of the reception intensity stored in the frame transmitted from the transceivers attached to the right front and rear wheels to determine which right-wheel-side transceiver is attached to which of the right front and rear wheels and ii) using an amplitude of the reception intensity stored in the frame transmitted from the transceivers attached to the left front and rear wheels to determine which left-wheel-side transceiver is attached to which of the left front and rear wheels, whereby the positions of the four wheels are detected.

23. The receiver of claim 22, wherein the processing means comprises means for i) determining, of the right front and rear wheels, which wheel is positionally nearer to the first triggering device than the other wheel based on the data stored in the frames transmitted from the transceivers, when the first triggering device outputs the triggering signal, means for ii) determining, of the left front and rear wheels, which wheel is positionally nearer to the second triggering device than the other wheel based on the data stored in the frames transmitted from the transceivers, when the second triggering device outputs the triggering signal, and means for iii) determining, of the right front and left wheels, which wheel is positionally farther from the first triggering device than the other wheel and, of the left front and rear wheels, which wheel is positionally farther from the second triggering device than the other wheel, based on both the data stored in the frames transmitted from the transceivers when the first triggering device outputs the triggering signal and the data stored in the frames transmitted from the transceivers when the second triggering device outputs the triggering signal.

* * * * *